United States Patent
Lee et al.

(10) Patent No.: US 12,476,679 B2
(45) Date of Patent: Nov. 18, 2025

(54) BEAMFORMING TECHNIQUE USING APPROXIMATE CHANNEL DECOMPOSITION

(71) Applicant: Telefonaktiebolaget LM Ericsson (publ), Stockholm (SE)

(72) Inventors: Heunchul Lee, Täby (SE); Niklas Wernersson, Kungsängen (SE); Robert Mark Harrison, Grapevine, TX (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 645 days.

(21) Appl. No.: 17/799,790

(22) PCT Filed: Mar. 18, 2021

(86) PCT No.: PCT/SE2021/050241
§ 371 (c)(1),
(2) Date: Aug. 15, 2022

(87) PCT Pub. No.: WO2021/188036
PCT Pub. Date: Sep. 23, 2021

(65) Prior Publication Data
US 2023/0087742 A1   Mar. 23, 2023

Related U.S. Application Data

(60) Provisional application No. 62/991,753, filed on Mar. 19, 2020.

(51) Int. Cl.
*H04B 7/02* (2018.01)
*H04B 7/0456* (2017.01)
*H04B 7/06* (2006.01)

(52) U.S. Cl.
CPC ......... *H04B 7/0478* (2013.01); *H04B 7/0617* (2013.01); *H04B 7/063* (2013.01)

(58) Field of Classification Search
CPC ............................. H04B 7/063; H04B 7/0617
(Continued)

(56) References Cited

U.S. PATENT DOCUMENTS

2008/0303699 A1* 12/2008 Zhang ................. H04L 27/2601
375/302
2013/0083864 A1*  4/2013 Moulsley ............. H04B 7/0417
375/267
2015/0103933 A1*  4/2015 Nagata ................. H04B 7/0482
375/260

FOREIGN PATENT DOCUMENTS

WO      2019118250 A1    6/2019

OTHER PUBLICATIONS

NEC Group, On the 4TX Codebook Enhancement, Apr. 15-19, 2013, 3GPP TSG_RAN WG1 Meeting #172b, Chicago, Illinois, (Year: 2013).*

(Continued)

*Primary Examiner* — Zewdu A Kassa
(74) *Attorney, Agent, or Firm* — Weisberg I.P. Law, P.A.

(57) ABSTRACT

A method, system and apparatus for beamforming techniques that use approximate channel decomposition are disclosed. According to one aspect, a wireless device is provided. The wireless device includes processing circuitry configured to use a non-constant modulus, NCM, precoder of a NCM codebook to transmit on a physical channel where the NCM codebook is based at least in part on a constant modulus, CM, codebook and a plurality of NCM component matrices, and where the plurality of NCM component matrices are based at least in part on a NCM component matrix mathematical expression, and where an approximate decomposition element-wise product of a CM component matrix mathematical expression and the NCM component matrix mathematical expression corresponds to a channel decomposition matrix.

26 Claims, 8 Drawing Sheets

(58) Field of Classification Search
USPC .............. 375/267, 260, 259, 219, 295, 316
See application file for complete search history.

(56) References Cited

OTHER PUBLICATIONS

International Search Report and Written Opinion dated Jun. 10, 2021 for International Application No. PCT/SE2021/050241 filed Mar. 18, 2021; consisting of 11 pages.
3GPP TS 38.211 V16.0.0; 3rd Generation Partnership Project; Technical Specification Group Radio Access Network: NR; Physical channels and modulation (Release 16); Dec. 2019; consisting of 129 pages.
Nash, J.C.; A one-sided transformation method for the singular value decomposition and algebraic eigenproblem; The Computer Journal; Oct. 1973, pp. 74-76, Research Division, Economics Branch, Agriculture Canada, Ottawa, Canada; consisting of 3 pages.
3GPP TSG-RAN WG1 Meeting #72b R1-131714; Title: On the 4TX Codebook Enhancement; Agenda Item: 7.2.2.1; Source: NEC Group; Document for: Discussion and Decision; Date and Location: Apr. 15-19, 2013, Chicago, Illinois, consisting of 10 pages.

\* cited by examiner

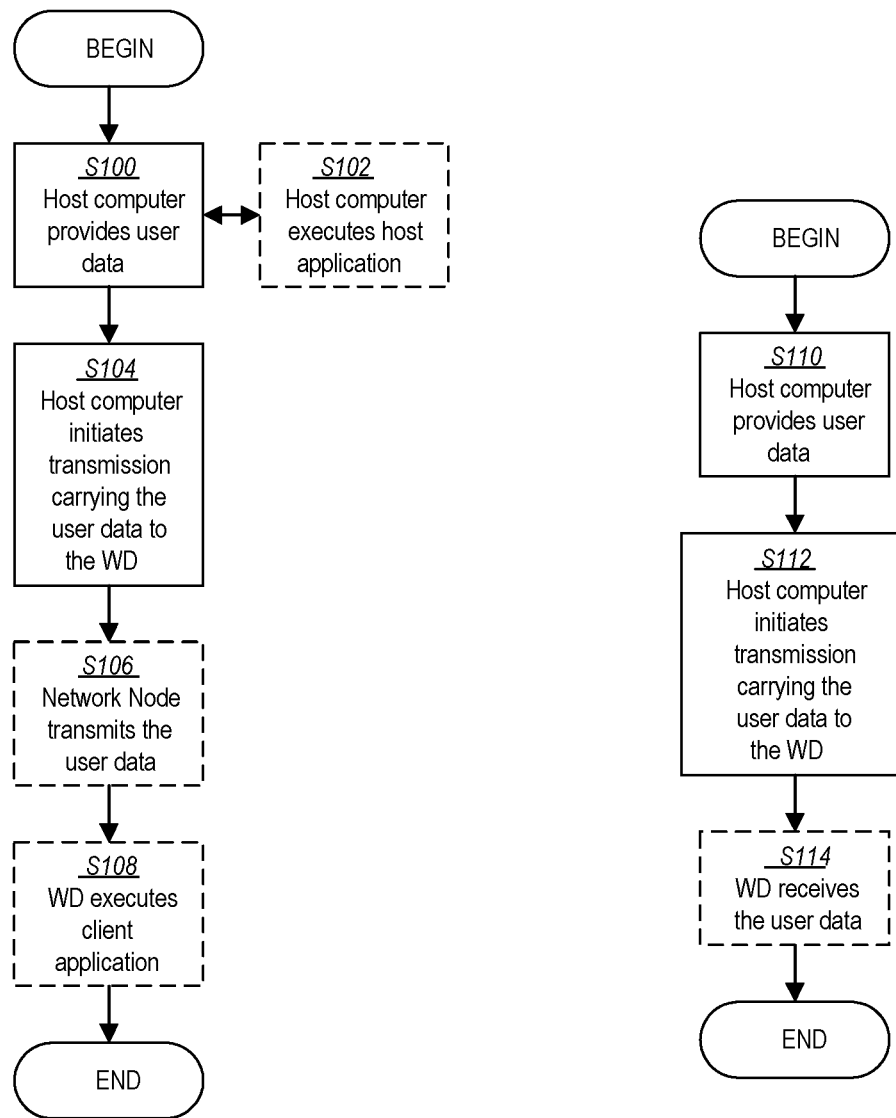

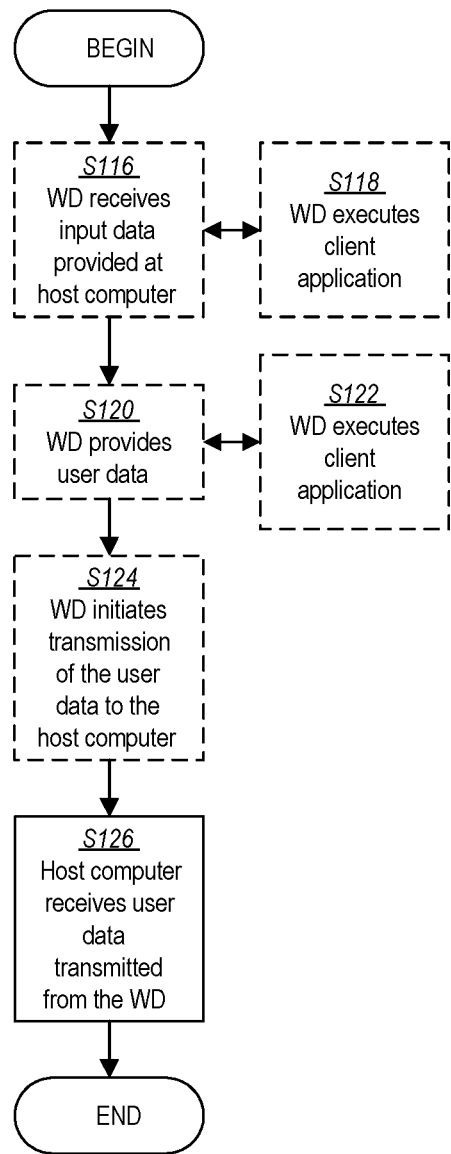
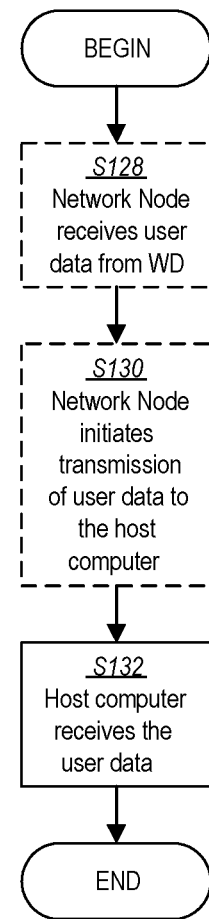
FIG. 7
FIG. 8

BEAMFORMING TECHNIQUE USING APPROXIMATE CHANNEL DECOMPOSITION

CROSS-REFERENCE TO RELATED APPLICATIONS

This application is a Submission Under 35 U.S.C. § 371 for U.S. National Stage Patent Application of International Application No.: PCT/SE2021/050241, filed Mar. 18, 2021 entitled "BEAMFORMING TECHNIQUE USING APPROXIMATE CHANNEL DECOMPOSITION," which claims priority to U. S. Provisional Application No.: 62/991,753, filed Mar. 19, 2020, entitled "BEAMFORMING TECHNIQUE USING APPROXIMATE CHANNEL DECOMPOSITION," the entireties of both of which are incorporated herein by reference.

TECHNICAL FIELD

The present disclosure relates to wireless communications, and in particular, to beamforming techniques that use approximate channel decomposition.

BACKGROUND

The telecommunications industry is moving quickly toward the new era of Fifth Generation (5G) wireless communications. 5G (also called New Radio (NR)) is being designed by groups such as the $3^{rd}$ Generation Partnership Project (3GPP) and implemented to provide improved capabilities over previous generations of mobile communications, such as Long Term Evolution (LTE) or Fourth Generation (4G). Such improvements relate to spectral efficiency, latency, reliability and device density. Multi input multi output (MIMO) communication is one technology that enables 5G. The benefits of MIMO systems can be exploited when accurate channel state information (CSI) is available at the transmitter.

Closed-loop MIMO systems can support spatial multiplexing with channel dependent precoding. The spatial multiplexing mode is aimed for high data rates in favorable channel conditions. An illustration of a spatial multiplexing operation is provided in FIG. 1 where CP-OFDM is used on the downlink and/or uplink.

As shown in FIG. 1, the information carrying symbol vector s is multiplied by an $N_T \times r$ precoder matrix W, which serves to distribute the transmit energy in a subspace of the $N_T$ (corresponding to $N_T$ antenna ports) dimensional vector space. The precoder matrix is typically selected from a codebook of possible precoder matrices, and may be indicated by using a transmit precoder matrix indicator (TPMI), which specifies a unique precoder matrix in the codebook for a given number of symbol streams. The r symbols in s each correspond to a layer and r is referred to as the transmission rank. In this way, spatial multiplexing is achieved because multiple symbols can be transmitted simultaneously over the same time/frequency resource element (TFRE). The number of symbols r is typically adapted to suit the current channel properties.

The received $N_R \times 1$ vector $y_n$ for a certain TFRE on subcarrier n (or alternatively data TFRE number n) is thus modeled by $$y_n = H_n W s_n + e_n \qquad \text{Equation 1}$$

where $e_n$ is a noise/interference vector obtained as realizations of a random process. The precoder W can be a wideband precoder, which is constant over frequency, or is frequency selective.

The precoder matrix W is often chosen to match the characteristics of the $N_R \times N_T$ MIMO channel matrix $H_n$, resulting in so-called channel dependent precoding. This is also commonly referred to as closed-loop precoding and essentially strives for focusing the transmit energy into a subspace which is strong in the sense of conveying much of the transmitted energy to the WD. In addition, the precoder matrix may also be selected to strive for orthogonalizing the channel, meaning that after proper linear equalization at the WD, the inter-layer interference is reduced.

One example method to select a precoder matrix W can be to select the $W_k$ that maximizes the Frobenius norm of the hypothesized equivalent channel:

$$\max_k \left\| \hat{H}_n W_k \right\|_F^2 \qquad \text{Equation 2}$$

Where
 $\hat{H}_n$ is a channel estimate, possibly derived from channel state information reference signal (CSI-RS) or sounding reference signal (SRS);
 $W_k$ is a hypothesized precoder matrix with index k; and
 $\hat{H}_n W_k$ is the hypothesized equivalent channel.

To accommodate new applications and use cases carried by 5G, wireless 5G networks will be deployed with many new types of base stations (BSs), referred to herein as network nodes, and connected to user devices (UEs), referred to herein as wireless devices (WDs), using various antenna array configurations. Basically, different antenna configurations correspond to different correlation levels between antennas and it becomes important to make sure that the 5G BSs and WDs should be able to achieve performance requirements under a wide range of spatial correlation. However, most existing standard codebooks are designed for regular antenna arrays. For instance, the NR 3GPP Release 15 (Rel-15) downlink (DL) codebook adopts discrete Fourier transform (DFT) beams as its basic beam set, which works well under regular array deployments such as a uniform linear array (ULA), but not under a wide range of array deployments such as irregular antenna arrays and cylindrical arrays.

SUMMARY

Some embodiments advantageously provide methods, systems, and apparatuses for beamforming techniques that use approximate channel decomposition.

Solutions for achieving codebooks that behave well under a wide range of spatial correlation have been sought. To this end, unlike the typical codebook design methods that exploit the channel spatial correlation matrix of the MIMO channel matrix, codebooks presented herein are designed by assuming a spatially-uncorrelated channel matrix. Under this assumption, the optimal codebook can be obtained by computing channel matrix decompositions. In order to achieve a compromise between system performance and signaling overhead, a codebook design method based on an approximate channel matrix decomposition is described herein.

According to one aspect of the disclosure, a wireless device is provided. The wireless device includes processing circuitry configured to use a non-constant modulus, NCM, precoder of a NCM codebook to transmit on a physical channel where the NCM codebook is based at least in part on a constant modulus, CM, codebook and a plurality of NCM component matrices, and where the plurality of NCM component matrices are based at least in part on a NCM component matrix mathematical expression. An approximate decomposition element-wise product of a CM component matrix mathematical expression and the NCM component matrix mathematical expression corresponds to a channel decomposition matrix.

According to one or more embodiments of this aspect, the NCM codebook is based at least in part on an element-wise product of the CM codebook and selected columns of the plurality of NCM component matrices. According to one or more embodiments of this aspect, the CM codebook is based on a plurality of CM component matrices. According to one or more embodiments of this aspect, the CM codebook corresponds to selected columns of the plurality of CM component matrices.

According to one or more embodiments of this aspect, the processing circuitry is further configured to one of receive the NCM codebook and be preconfigured with the NCM codebook. According to one or more embodiments of this aspect, the NCM codebook is a 4-port codebook having a rank of at least 1. According to one or more embodiments of this aspect, all non-zero elements in the CM component matrix mathematical expression have the same absolute value. According to one or more embodiments of this aspect, at least one non-zero element in the NCM component matrix mathematical expression does not have a same absolute value as at least one other non-zero element in the NCM component matrix mathematical expression.

According to another aspect of the disclosure, a network node configured to communicate with a wireless device is provided. The network node including processing circuitry configured to indicate a non-constant modulus, NCM, precoder of a NCM codebook to implement for transmitting on a physical channel where the NCM codebook is based at least in part on a constant modulus, CM, codebook and a plurality of NCM component matrices and where the plurality of NCM component matrices being based at least in part on a NCM component matrix mathematical expression. An approximate decomposition element-wise product of a CM component matrix mathematical expression and the NCM component matrix mathematical expression corresponds to a channel decomposition matrix. The processing circuitry is further configured to receive a transmission, on the physical channel, that is based on the NCM precoder.

According to one or more embodiments of this aspect, the NCM codebook is based at least in part on an element-wise product of the CM codebook and selected columns of the plurality of NCM component matrices. According to one or more embodiments of this aspect, the CM codebook is based on a plurality of CM component matrices. According to one or more embodiments of this aspect, the CM codebook corresponds to selected columns of the plurality of CM component matrices.

According to one or more embodiments of this aspect, the NCM codebook is a 4-port codebook having a rank of at least 1. According to one or more embodiments of this aspect, all non-zero elements in the CM component matrix mathematical expression have the same absolute value. According to one or more embodiments of this aspect, at least one non-zero element in the NCM component matrix mathematical expression does not have a same absolute value as at least one other non-zero element in the NCM component matrix mathematical expression.

According to another aspect of the disclosure, a method implemented by a wireless device is provided. A non-constant modulus, NCM, precoder of a NCM codebook is used to transmit on a physical channel where the NCM codebook is based at least in part on a constant modulus, CM, codebook and a plurality of NCM component matrices, and where the plurality of NCM component matrices are based at least in part on a NCM component matrix mathematical expression. An approximate decomposition element-wise product of a CM component matrix mathematical expression and the NCM component matrix mathematical expression corresponds to a channel decomposition matrix.

According to one or more embodiments of this aspect, the NCM codebook is based at least in part on an element-wise product of the CM codebook and selected columns of the plurality of NCM component matrices. According to one or more embodiments of this aspect, the CM codebook is based on a plurality of CM component matrices. According to one or more embodiments of this aspect, the CM codebook corresponds to selected columns of the plurality of CM component matrices.

According to one or more embodiments of this aspect, one of the NCM codebook are received and are preconfigured with the NCM codebook. According to one or more embodiments of this aspect, the NCM codebook is a 4-port codebook having a rank of at least 1. According to one or more embodiments of this aspect, all non-zero elements in the CM component matrix mathematical expression have the same absolute value. According to one or more embodiments of this aspect, at least one non-zero element in the NCM component matrix mathematical expression does not have a same absolute value as at least one other non-zero element in the NCM component matrix mathematical expression.

According to another aspect of the disclosure, a method implemented by a network node that is configured to communicate with a wireless device is provided. A non-constant modulus, NCM, precoder of a NCM codebook to implement for transmitting on a physical channel is indicated where the NCM codebook being based at least in part on a constant modulus, CM, codebook and a plurality of NCM component matrices and where the plurality of NCM component matrices are based at least in part on a NCM component matrix mathematical expression. An approximate decomposition element-wise product of a CM component matrix mathematical expression and the NCM component matrix mathematical expression corresponds to a channel decomposition matrix. A transmission, on the physical channel, that is based on the NCM precoder is received.

According to one or more embodiments of this aspect, the NCM codebook is based at least in part on an element-wise product of the CM codebook and selected columns of the plurality of NCM component matrices. According to one or more embodiments of this aspect, the CM codebook is based on a plurality of CM component matrices. According to one or more embodiments of this aspect, the CM codebook corresponds to selected columns of the plurality of CM component matrices. According to one or more embodiments of this aspect, the NCM codebook is a 4-port codebook having a rank of at least 1.

According to one or more embodiments of this aspect, all non-zero elements in the CM component matrix mathematical expression have the same absolute value. According to one or more embodiments of this aspect, at least one non-zero element in the NCM component matrix mathematical expression does not have a same absolute value as at least one other non-zero element in the NCM component matrix mathematical expression.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 5 is a flowchart illustrating example methods implemented in a communication system including a host computer, a network node and a wireless device for executing a client application at a wireless device according to some embodiments of the present disclosure;

FIG. 6 is a flowchart illustrating example methods implemented in a communication system including a host computer, a network node and a wireless device for receiving user data at a wireless device according to some embodiments of the present disclosure;

FIG. 7 is a flowchart illustrating example methods implemented in a communication system including a host computer, a network node and a wireless device for receiving user data from the wireless device at a host computer according to some embodiments of the present disclosure;

FIG. 8 is a flowchart illustrating example methods implemented in a communication system including a host computer, a network node and a wireless device for receiving user data at a host computer according to some embodiments of the present disclosure;

DETAILED DESCRIPTION

Figure 1:
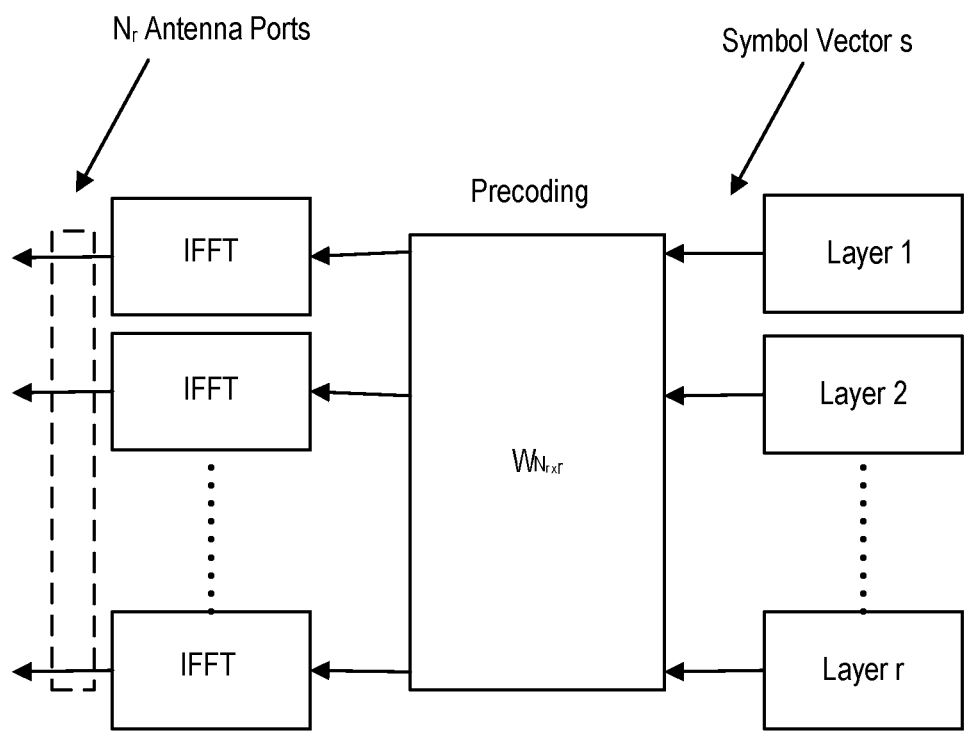
FIG. 1 is a block diagram showing precoding.

Before describing in detail exemplary embodiments, it is noted that the embodiments reside primarily in combinations of apparatus components and processing steps related to beamforming techniques that use approximate channel decomposition. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide beamforming techniques that use approximate channel decomposition. In some embodiments, precoding matrix W can be obtained by computing channel matrix decompositions such as the singular value decomposition (SVD) of the channel matrix or the eigen-value decomposition (EVD) of channel covariance matrix. However, for MIMO transmissions with a number of ports greater than 2, the optimal decomposition solution can be obtained by applying an iterative method to the channel matrix or its covariance matrix.

As described herein, an example codebook design method is based on an approximate matrix decomposition. The codebook design method described herein enables construction of codebooks with a desired codebook size, which allows a flexible tradeoff between performance and codebook size.

Figure 2:
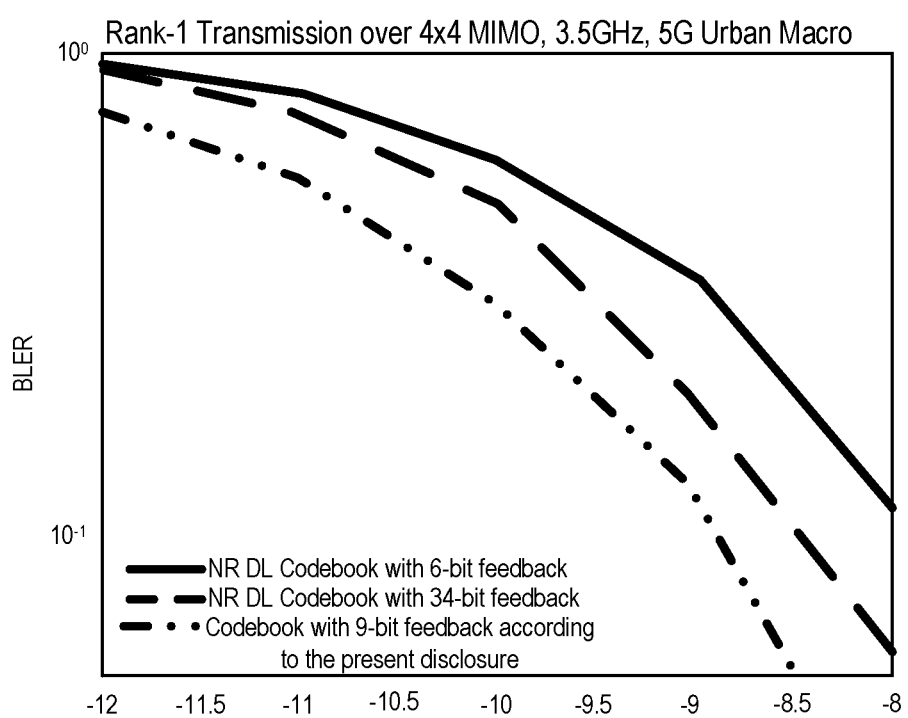
FIG. 2 shows performance curves for some embodiments described herein.
Figure 3:
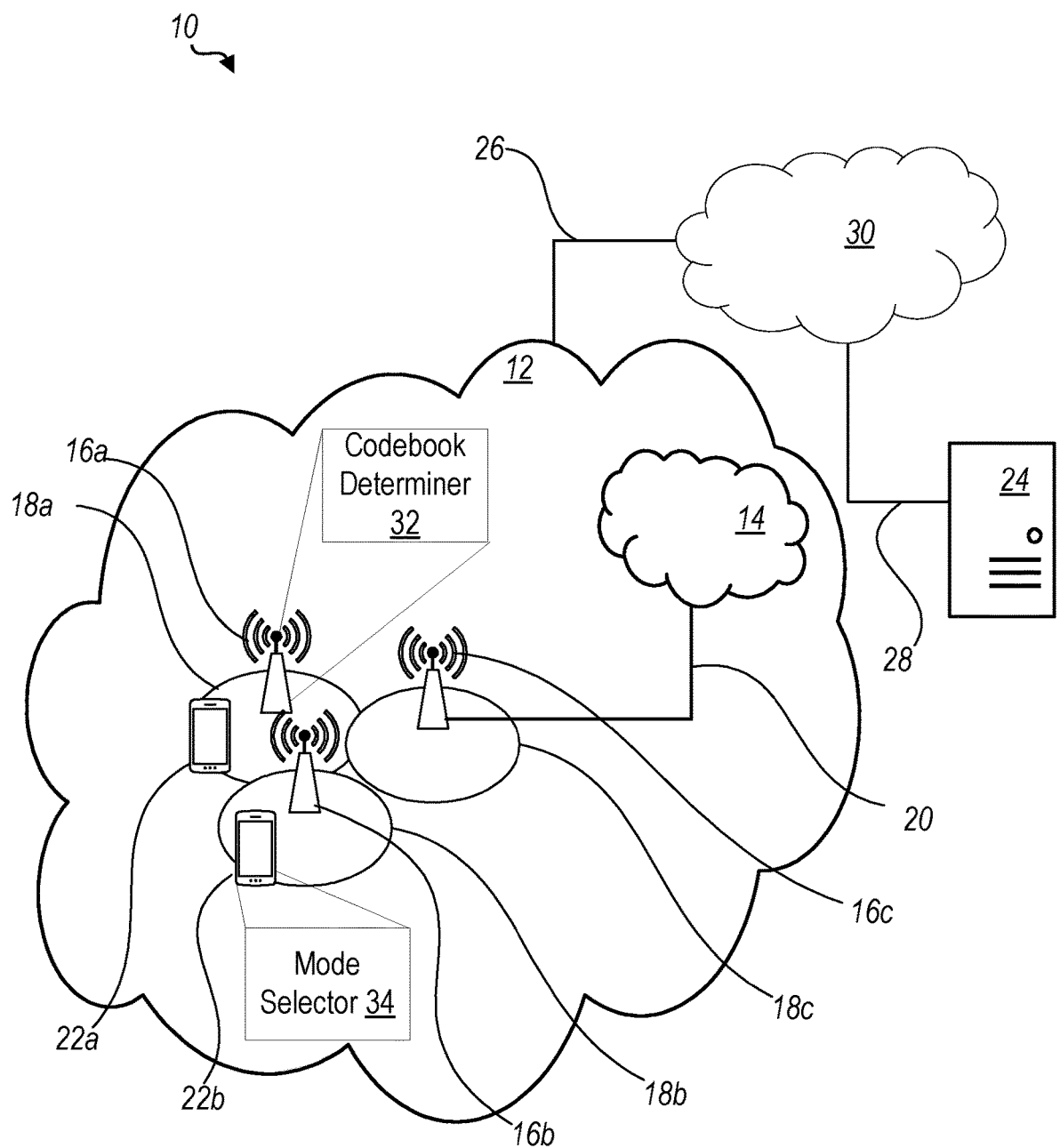
FIG. 3 is a schematic diagram of an example network architecture illustrating a communication system connected via an intermediate network to a host computer according to the principles in the present disclosure.

A comparison is made between the proposed codebook and the 3GPP Release-15 Type-1 codebook under spatially-correlated channels and using the 5G 3-dimensional (3D) urban macro (UMA) channel model defined by the Third Generation Partnership Project (3GPP). The number of subbands is assumed to be 2 in an example codebook with feedback size of 9 bits, while the wideband application with feedback size of 6 bits and 8-subband application with feedback size of 34 bits are simulated for the Release-15 codebook. As shown in FIG. 2, the proposed codebook with 9-bit feedback outperforms the NR 3GPP Release 15 downlink (DL) codebook type I with 34-bit feedback under the 5G UMA channel model and the measured antenna patterns. The simulation results demonstrate that the codebooks described herein can achieve a good compromise between system performance and feedback overhead in codebook-based MIMO transmissions Referring again to the drawing figures, in which like elements are referred to by like reference numerals, there is shown in FIG. 3 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 3 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over)

to a connected WD 22a. Similarly, the network node 16 need not be aware of the future routing of an outgoing uplink communication originating from the WD 22a towards the host computer 24.

A network node 16 is configured to include a codebook determiner 32 which is configured to determine CM and NCM codebooks. A wireless device 22 is configured to include a mode selector 34 which is configured to select between CM and NCM modes of operation.

Example implementations, in accordance with an embodiment, of the WD 22, network node 16 and host computer 24 discussed in the preceding paragraphs will now be described with reference to FIG. 4. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include a codebook determiner 32 which is configured to determine CM and NCM codebooks.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a mode selector 34 which is configured to select between CM and NCM modes of operation.

Figure 4:
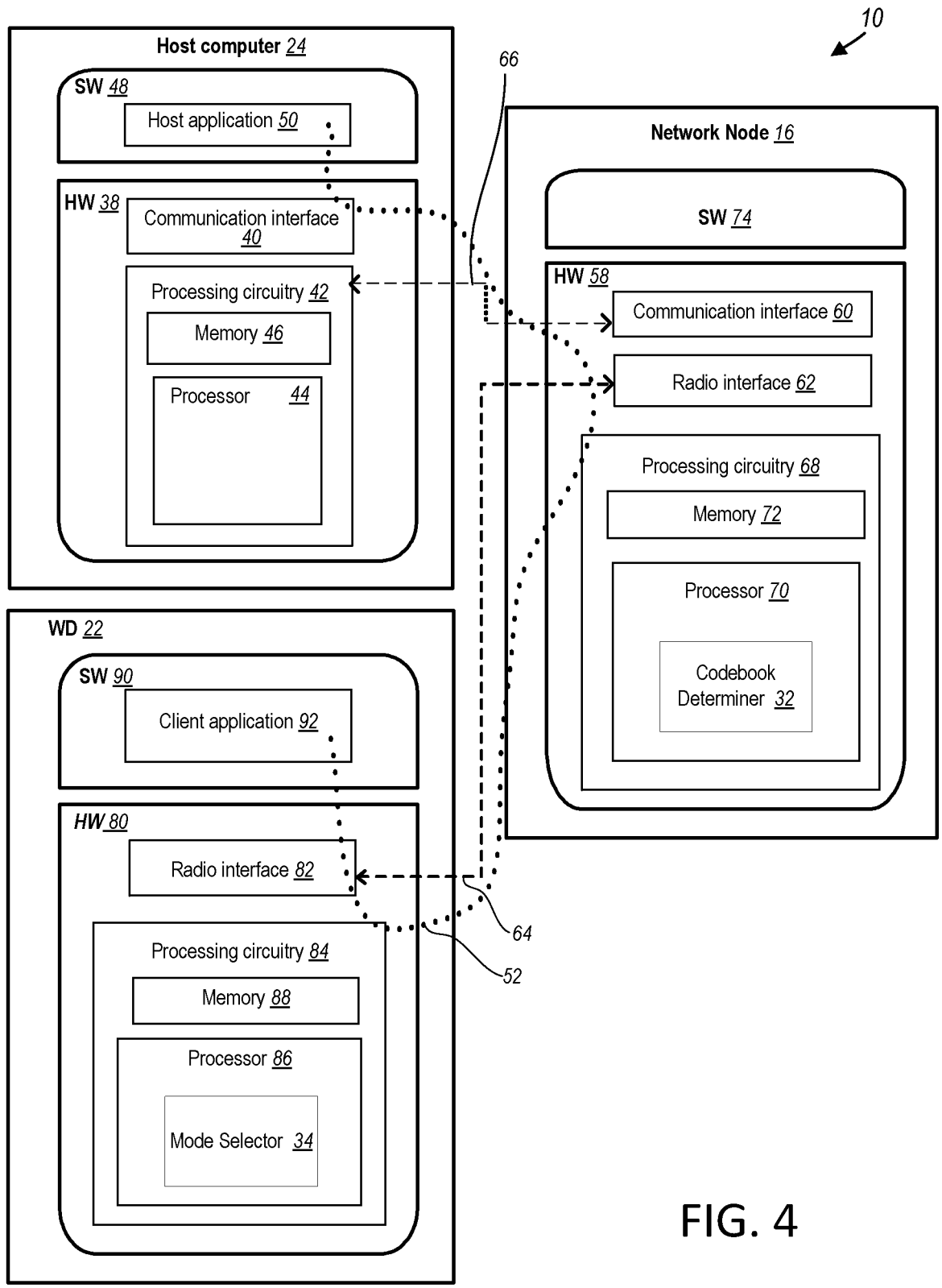
FIG. 4 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 3 and independently, the surrounding network topology may be that of FIG. 4.

In FIG. 4, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors, etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 3 and 4 show various "units" such as the codebook determiner 32, and the mode selector 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 5 is a flowchart illustrating an exemplary method implemented in a communication system, such as, for example, the communication system of FIGS. 3 and 4, in accordance with one embodiment. The communication system may include a host computer 24, a network node 16 and a WD 22, which may be those described with reference to FIG. 4. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 6 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

FIG. 7 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 8 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 9:
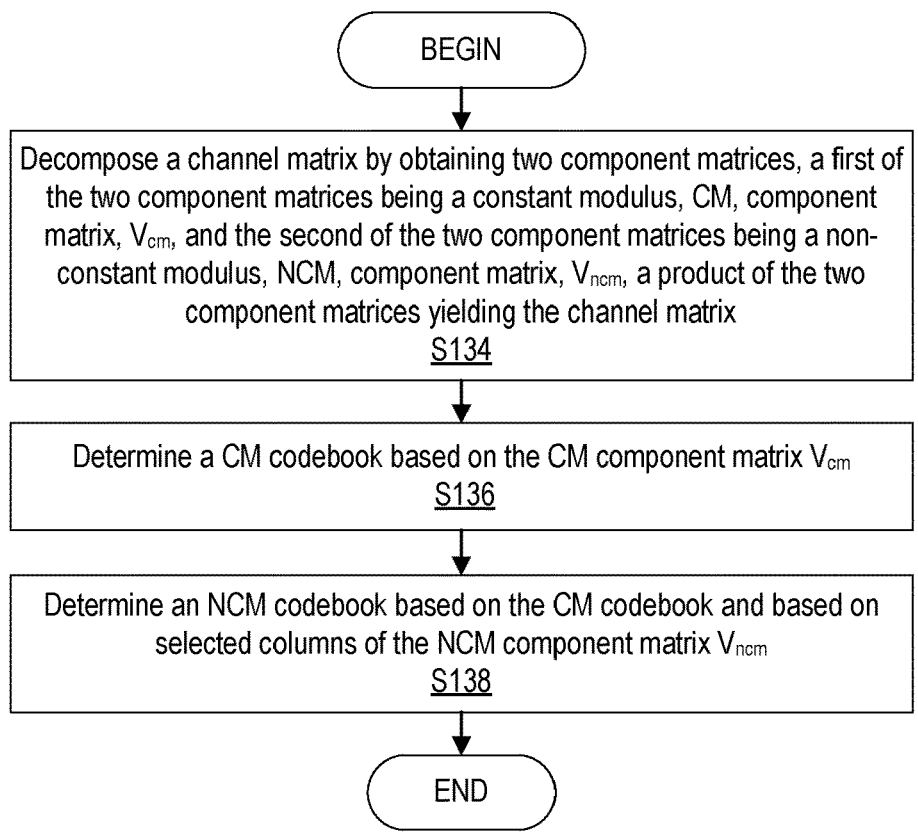
FIG. 9 is a flowchart of an example process in a network node for beamforming techniques that use approximate channel decomposition.

FIG. 9 is a flowchart of an exemplary process in a network node 16 for beamforming techniques that use approximate channel decomposition according to some embodiments of the present disclosure. One or more blocks described herein may be performed by one or more elements of network node 16 such as by one or more of processing circuitry 68 (including the codebook determiner 32), processor 70, radio interface 62 and/or communication interface 60. Network node 16 such as via processing circuitry 68 and/or processor 70 and/or radio interface 62 and/or communication interface 60 is configured to decompose a channel matrix by obtaining two component matrices, a first of the two component matrices being a constant modulus, CM, component matrix, $V_{cm}$, and the second of the two component matrices being a non-constant modulus, NCM, component matrix, $V_{ncm}$, a product of the two component matrices yielding the channel matrix (Block S134). The process also includes determining a CM codebook based on the CM component matrix $V_{cm}$ (Block S136). The process further includes determining an NCM codebook based on the CM codebook and based on selected columns of the NCM component matrix $V_{ncm}$ (Block S138).

Figure 10:
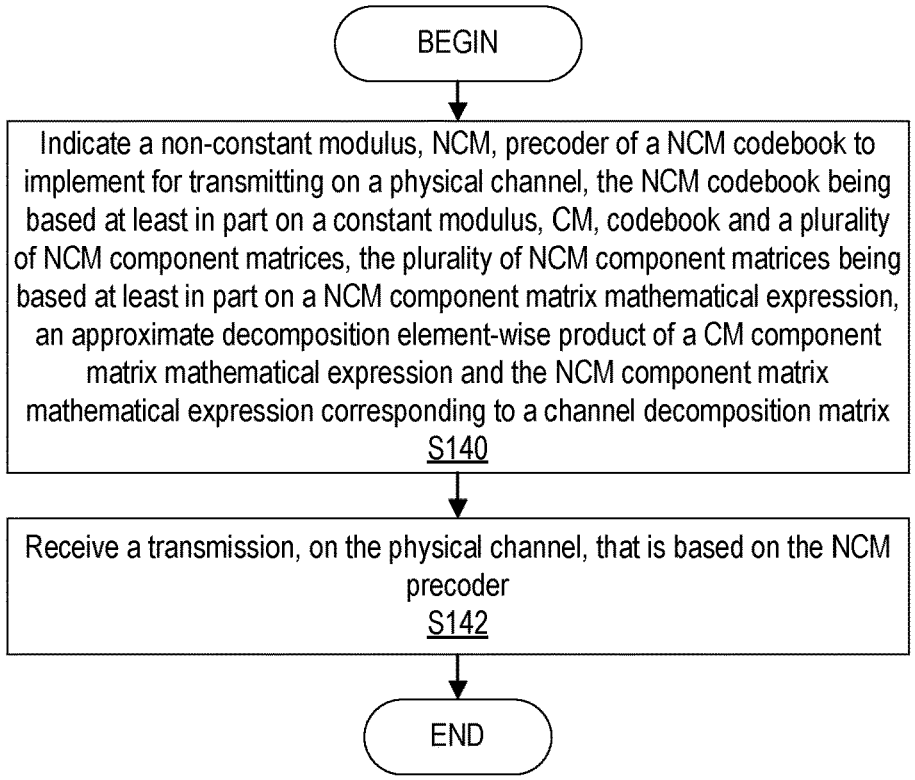
FIG. 10 is a flowchart of another example process in a network node for beamforming techniques that use approximate channel decomposition.

FIG. 10 is a flowchart of another example process in a network node 16 according to some embodiments of the present disclosure. One or more blocks described herein may be performed by one or more elements of network node 16 such as by one or more of processing circuitry 68 (including the codebook determiner 32), processor 70, radio interface 62 and/or communication interface 60. Network node 16 is configured to indicate (Block S140) a non-constant modulus, NCM, precoder of a NCM codebook to implement for transmitting on a physical channel where the NCM codebook is based at least in part on a constant modulus, CM, codebook and a plurality of NCM component matrices, and where the plurality of NCM component matrices are based at least in part on a NCM component matrix mathematical expression, as described herein. An approximate decomposition element-wise product of a CM component matrix mathematical expression and the NCM component matrix mathematical expression corresponds to a channel decomposition matrix, as described herein. The network node 16 is configured to receive (Block S142) a transmission, on the physical channel, that is based on the NCM precoder, as described herein.

According to one or more embodiments, the NCM codebook is based at least in part on an element-wise product of the CM codebook and selected columns of the plurality of NCM component matrices. According to one or more embodiments, the CM codebook is based on a plurality of CM component matrices. According to one or more embodiments, the CM codebook corresponds to selected columns of the plurality of CM component matrices.

According to one or more embodiments, the NCM codebook is a 4-port codebook having a rank of at least 1. According to one or more embodiments, all non-zero elements in the CM component matrix mathematical expression have the same absolute value. According to one or more embodiments, at least one non-zero element in the NCM component matrix mathematical expression does not have a same absolute value as at least one other non-zero element in the NCM component matrix mathematical expression.

Figure 11:
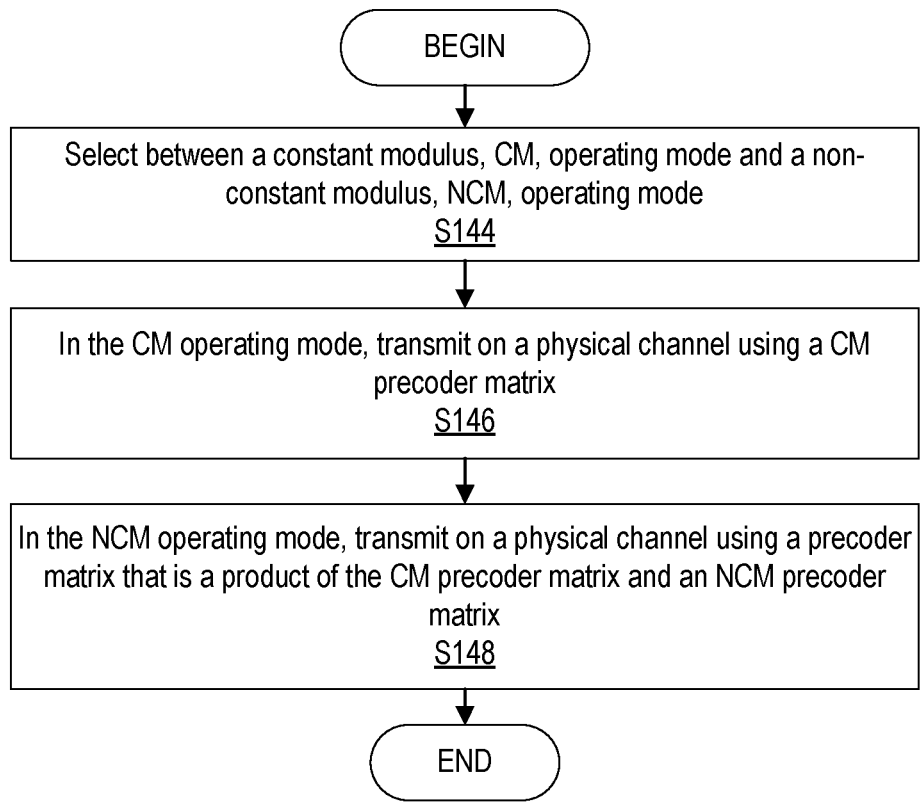
FIG. 11 is a flowchart of an example process in a wireless device for beamforming techniques that use approximate channel decomposition.

FIG. 11 is a flowchart of an exemplary process in a wireless device 22 according to some embodiments of the present disclosure. One or more blocks described herein may be performed by one or more elements of wireless device 22 such as by one or more of processing circuitry 84 (including the mode selector 34), processor 86, radio interface 82 and/or communication interface 60. Wireless device 22 such as via processing circuitry 84 and/or processor 86 and/or radio interface 82 is configured to select between a constant modulus, CM, operating mode and a non-constant modulus, NCM, operating mode (Block S144). The process also includes in the CM operating mode, transmitting on a physical channel using a CM precoder matrix (Block S146). The process further includes in the NCM operating mode, transmitting on a physical channel using a precoder matrix that is a product of the CM precoder matrix and an NCM precoder matrix (Block S148).

Figure 12:
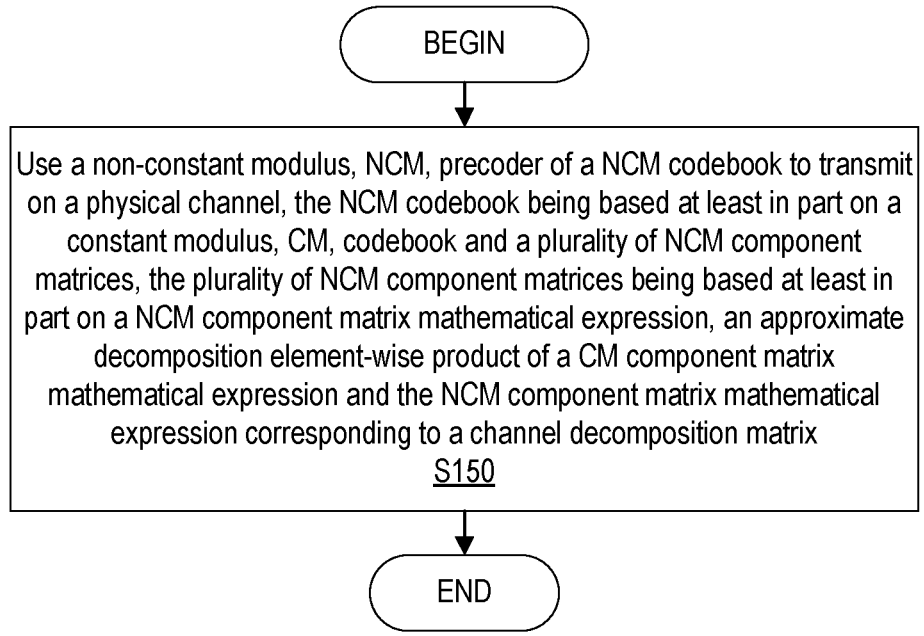
FIG. 12 is a flowchart of another example process in a network node for beamforming techniques that use approximate channel decomposition.

FIG. 12 is a flowchart of another example process in a wireless device 22 according to some embodiments of the present disclosure. One or more blocks described herein may be performed by one or more elements of wireless device 22 such as by one or more of processing circuitry 84 (including the mode selector 34), processor 86, radio interface 82 and/or communication interface 60. Wireless device 22 is configured to use (Block S150) a non-constant modulus, NCM, precoder of a NCM codebook to transmit on a physical channel where the NCM codebook is based at least in part on a constant modulus, CM, codebook and a plurality of NCM component matrices and the plurality of NCM component matrices are based at least in part on a NCM component matrix mathematical expression where an approximate decomposition element-wise product of a CM component matrix mathematical expression and the NCM component matrix mathematical expression corresponds to a channel decomposition matrix, as described herein.

According to one or more embodiments, the NCM codebook is based at least in part on an element-wise product of the CM codebook and selected columns of the plurality of NCM component matrices. According to one or more embodiments, the CM codebook is based on a plurality of CM component matrices. According to one or more embodiments, the CM codebook corresponds to selected columns of the plurality of CM component matrices.

According to one or more embodiments, the processing circuitry is further configured to one of receive the NCM codebook, and be preconfigured with the NCM codebook. According to one or more embodiments, the NCM codebook is a 4-port codebook having a rank of at least 1. According to one or more embodiments, all non-zero elements in the CM component matrix mathematical expression have the same absolute value. According to one or more embodiments, at least one non-zero element in the NCM component matrix mathematical expression does not have a same absolute value as at least one other non-zero element in the NCM component matrix mathematical expression.

Having described the general process flow of arrangements of the disclosure and having provided examples of hardware and software arrangements for implementing the processes and functions of the disclosure, the sections below provide details and examples of arrangements for beamforming techniques that use approximate channel decomposition.

A precoding matrix W can be obtained by computing the matrix decompositions such as the singular value decomposition (SVD) of the channel matrix or the eigen-value decomposition (EVM) of channel covariance matrix. Among several approaches for computing the matrix decomposition, the Jacobi method is widely used in the initial step of the decomposition procedure to diagonalize a real-valued matrix through successive column orthogonalizations of the matrix. However, the conventional iterative method leads to high computational complexity or signaling overhead. In order to achieve a compromise between system performance and signaling overhead, a codebook design method based on an approximate channel matrix decomposition is described below.

At the transmitter as illustrated in FIG. 1, the data vector, denoted by s, is multiplied by the precoding matrix W to form a transmit vector x. Denoting the received signal vector by y, the received signal can be expressed by $$y = HWs + e = Gs + e$$

where H is the channel matrix with size $N_r \times N_t$, G is the effective channel matrix given by HW and e is the interference-plus-noise term.

The beamforming problem can be formulated to choose W that maximizes the Frobenius norm of G:

$$W_o = \max_W \|HW\|^2$$

Under the unitary assumption of $W^H W = I$, the optimal solution $W_o$ can be obtained from the SVD of the channel matrix H. Assume that the matrix H has an SVD $$H = U \Lambda V^H$$

where the columns of $U \in \mathbb{C}^{N_r \times N_r}$ and $V \in \mathbb{C}^{N_t \times N_t}$ are the ordered left and right singular vectors and $\Lambda \in \mathbb{R}^{N_r \times N_t}$ is a diagonal matrix with the ordered singular values.

Then, the optimal solution $W_o$ can be obtained by a function of the left singular vectors V. As mentioned above, an iterative method may be used to compute the right singular vectors V of channel matrix H. However, the iterative Jacobi method is really not suitable for the solution of the precoder design problem due to high computational complexity. A codebook design method based on an approximate matrix decomposition is described herein. An example precoding problem with 4 ports is presented. It is understood that the use of 4 ports is only one possible example. It is contemplated that the concepts and methods described herein can be generalized and implemented with arrangements having other than 4 ports.

A general expression for the channel decomposition matrix V is presented below. In particular, consider the four-transmit antenna case whose channel matrix can be represented by a complex-valued matrix $H \in \mathbb{C}^{N_r \times 4}$ with 4 ports and its SVD composition $H = U \Lambda V^H$.

The channel decomposition V can be expressed as an element-wise product of two component matrices:

$$V = V_{cm} \odot V_{ncm} \qquad \text{Equation 3}$$

where $V_{cm}$ is a constant-modulus (CM) component matrix, $V_{ncm}$ is a non-constant modulus (NCM) component matrix, and $\odot$ denotes the element-wise product of two matrices.

Herein a constant modulus matrix is one where all non-zero elements of a matrix have the same absolute value, while a non-constant modulus matrix is one where the non-zero elements may not have the same absolute value.

A general expression for $V_{cm}$ and $V_{ncm}$ is proposed and then finite sets of CM and NCM matrices are generated based on the proposed expressions, which will be used to create codebooks below.

Consider the following expression (mathematical expression) for representing a CM component matrix $V_{cm}$ $$V_{cm} \in \left\{ \begin{bmatrix} M_{1,1}^\alpha & M_{1,2}^\alpha & 0 & 0 \\ M_{2,1}^\alpha & M_{2,2}^\alpha & 0 & 0 \\ 0 & 0 & M_{1,1}^\beta & M_{1,2}^\beta \\ 0 & 0 & M_{2,1}^\beta & M_{2,2}^\beta \end{bmatrix} \begin{bmatrix} M_{1,1}^\gamma & 0 & M_{1,2}^\gamma & 0 \\ 0 & M_{1,1}^\gamma & 0 & M_{1,2}^\gamma \\ M_{2,1}^\gamma & 0 & M_{2,2}^\gamma & 0 \\ 0 & M_{2,1}^\gamma & 0 & M_{2,2}^\gamma \end{bmatrix} \middle| \begin{array}{l} \alpha \in \{1,2,3,4\}, \\ \beta \in \{1,2,3,4\}, \gamma \in \{1,2,3,4\} \end{array} \right\}$$

Equation 4 where, $M^i_{n,m}$ indicates the (n, m)-th entry of matrix $M^i$ and the four 2-by-2 basis matrices $M^i$, i=1,2,3,4, are given in Table 1.

TABLE 1

Four 2-by-2 basis matrices

| i | 1 | 2 | 3 | 4 |
|---|---|---|---|---|
| $M^i = \begin{bmatrix} M^i_{1,1} & M^i_{1,2} \\ M^i_{2,1} & M^i_{2,2} \end{bmatrix}$ | $\frac{1}{\sqrt{2}}\begin{bmatrix} 1 & -1 \\ 1 & 1 \end{bmatrix}$ | $\frac{1}{\sqrt{2}}\begin{bmatrix} 1 & 1 \\ -1 & 1 \end{bmatrix}$ | $\frac{1}{\sqrt{2}}\begin{bmatrix} 1 & -j \\ -j & 1 \end{bmatrix}$ | $\frac{1}{\sqrt{2}}\begin{bmatrix} 1 & j \\ j & 1 \end{bmatrix}$ |

In one embodiment, a set of 16 CM matrices, denoted by $V_{cm}^n$, n=1,2, . . . ,16, can be obtained by selecting 16 parameter combinations of $\alpha \in \{1,3\}$, $\beta \in \{1,2,3,4\}$, and $\gamma \in \{1,3\}$. The set is listed in Table 2.

TABLE 2

A set of 16 CM matrices, denoted by $V_{cm}^n$ for n = 1, 2, . . . , 16

| n | α | β | γ | $V_{cm}^n$ |
|---|---|---|---|---|
| 1 | 1 | 1 | 1 | $\frac{1}{2}\begin{bmatrix} 1 & -1 & -1 & 1 \\ 1 & 1 & -1 & -1 \\ 1 & -1 & 1 & -1 \\ 1 & 1 & 1 & 1 \end{bmatrix}$ |
| 2 | 1 | 1 | 3 | $\frac{1}{2}\begin{bmatrix} 1 & -1 & -j & j \\ 1 & 1 & -j & -j \\ -j & j & 1 & -1 \\ -j & -j & 1 & 1 \end{bmatrix}$ |
| 3 | 1 | 2 | 1 | $\frac{1}{2}\begin{bmatrix} 1 & -1 & -1 & 1 \\ 1 & 1 & -1 & -1 \\ 1 & 1 & 1 & 1 \\ -1 & 1 & -1 & 1 \end{bmatrix}$ |
| 4 | 1 | 2 | 3 | $\frac{1}{2}\begin{bmatrix} 1 & -1 & -j & j \\ 1 & 1 & -j & -j \\ -j & -j & 1 & 1 \\ j & -j & -1 & 1 \end{bmatrix}$ |
| 5 | 1 | 3 | 1 | $\frac{1}{2}\begin{bmatrix} 1 & -1 & -1 & 1 \\ 1 & 1 & -1 & -1 \\ 1 & -j & 1 & -j \\ -j & 1 & -j & 1 \end{bmatrix}$ |
| 6 | 1 | 3 | 3 | $\frac{1}{2}\begin{bmatrix} 1 & -1 & -j & j \\ 1 & 1 & -j & -j \\ -j & -1 & 1 & -j \\ -1 & -j & -j & 1 \end{bmatrix}$ |
| 7 | 1 | 4 | 1 | $\frac{1}{2}\begin{bmatrix} 1 & -1 & -1 & 1 \\ 1 & 1 & -1 & -1 \\ 1 & j & 1 & j \\ j & 1 & j & 1 \end{bmatrix}$ |
| 8 | 1 | 4 | 3 | $\frac{1}{2}\begin{bmatrix} 1 & -1 & -j & j \\ 1 & 1 & -j & -j \\ -j & 1 & 1 & j \\ 1 & -j & j & 1 \end{bmatrix}$ |
| 9 | 3 | 1 | 1 | $\frac{1}{2}\begin{bmatrix} 1 & -j & -1 & j \\ -j & 1 & j & -1 \\ 1 & -1 & 1 & -1 \\ 1 & 1 & 1 & 1 \end{bmatrix}$ |
| 10 | 3 | 1 | 3 | $\frac{1}{2}\begin{bmatrix} 1 & -j & -j & 1 \\ -j & 1 & -1 & -j \\ -j & j & 1 & -1 \\ -j & -j & 1 & 1 \end{bmatrix}$ |
| 11 | 3 | 2 | 1 | $\frac{1}{2}\begin{bmatrix} 1 & -j & -1 & j \\ -j & 1 & j & -1 \\ 1 & 1 & 1 & 1 \\ -1 & 1 & -1 & 1 \end{bmatrix}$ |
| 12 | 3 | 2 | 3 | $\frac{1}{2}\begin{bmatrix} 1 & -j & -j & -1 \\ -j & 1 & -1 & -j \\ -j & -j & 1 & 1 \\ j & -j & -1 & 1 \end{bmatrix}$ |
| 13 | 3 | 3 | 1 | $\frac{1}{2}\begin{bmatrix} 1 & -j & -1 & j \\ -j & 1 & j & -1 \\ 1 & -j & 1 & -j \\ -j & 1 & -j & 1 \end{bmatrix}$ |

TABLE 2-continued

A set of 16 CM matrices, denoted by $V_{cm}^n$ for n = 1, 2, ..., 16

| n | α | β | γ | $V_{cm}^n$ |
|---|---|---|---|---|
| 14 | 3 | 3 | 3 | $\frac{1}{2}\begin{bmatrix} 1 & -j & -j & -1 \\ -j & 1 & -1 & -j \\ -j & -1 & 1 & -j \\ -1 & -j & -j & 1 \end{bmatrix}$ |
| 15 | 3 | 4 | 1 | $\frac{1}{2}\begin{bmatrix} 1 & -j & -1 & j \\ -j & 1 & j & -1 \\ 1 & j & 1 & j \\ j & 1 & j & 1 \end{bmatrix}$ |
| 16 | 3 | 4 | 3 | $\frac{1}{2}\begin{bmatrix} 1 & -j & -j & -1 \\ -j & 1 & -1 & -j \\ -j & 1 & 1 & j \\ 1 & -j & j & 1 \end{bmatrix}$ |

The following expression (mathematical expression) for representing a NCM matrix $V_{ncm}$ that is the non-constant modulus component matrix, is given by $$V_{ncm} \in \left\{ \begin{bmatrix} \cos\varphi_x & \sin\varphi_x & 0 & 0 \\ \sin\varphi_x & \cos\varphi_x & 0 & 0 \\ 0 & 0 & \cos\varphi_y & \sin\varphi_y \\ 0 & 0 & \sin\varphi_y & \cos\varphi_y \end{bmatrix} \begin{bmatrix} \cos\varphi_z & 0 & \sin\varphi_z & 0 \\ 0 & \cos\varphi_z & 0 & \sin\varphi_z \\ \sin\varphi_z & 0 & \cos\varphi_z & 0 \\ 0 & \sin\varphi_z & 0 & \cos\varphi_z \end{bmatrix} \varphi_x, \varphi_y, \varphi_z \in \Phi_M \right\}$$

Equation 5 where $\Phi_M$ is the set of M quantized angles given by $$\Phi_M = \left\{ \frac{m\pi}{2(M+1)} \,\bigg|\, m = 1, 2, \ldots, M \right\}$$

Equation 6

In an embodiment, a set of 8 NCM matrices can be defined by setting M=2, i.e., $\varphi_x \in \Phi_2$, $\varphi_y \in \Phi_2$, $\varphi_z \in \Phi_2$, which is listed in Table 3.

TABLE 3

A set of 8 NCM matrices, denoted by $V_{ncm}^n$ for n = 1, 2, ..., 8

| n | $V_{ncm}^n$ |
|---|---|
| 1 | $\frac{1}{4}\begin{bmatrix} 3 & \sqrt{3} & \sqrt{3} & 1 \\ \sqrt{3} & 3 & 1 & \sqrt{3} \\ \sqrt{3} & 1 & 3 & \sqrt{3} \\ 1 & \sqrt{3} & \sqrt{3} & 3 \end{bmatrix}$ |
| 2 | $\frac{1}{4}\begin{bmatrix} \sqrt{3} & 1 & 3 & \sqrt{3} \\ 1 & \sqrt{3} & \sqrt{3} & 3 \\ 3 & \sqrt{3} & \sqrt{3} & 1 \\ \sqrt{3} & 3 & 1 & \sqrt{3} \end{bmatrix}$ |
| 3 | $\frac{1}{4}\begin{bmatrix} 3 & \sqrt{3} & \sqrt{3} & 1 \\ \sqrt{3} & 3 & 1 & \sqrt{3} \\ 1 & \sqrt{3} & \sqrt{3} & 3 \\ \sqrt{3} & 1 & 3 & \sqrt{3} \end{bmatrix}$ |
| 4 | $\frac{1}{4}\begin{bmatrix} \sqrt{3} & 1 & 3 & \sqrt{3} \\ 1 & \sqrt{3} & \sqrt{3} & 3 \\ \sqrt{3} & 3 & 1 & \sqrt{3} \\ 3 & \sqrt{3} & \sqrt{3} & 1 \end{bmatrix}$ |
| 5 | $\frac{1}{4}\begin{bmatrix} \sqrt{3} & 3 & 1 & \sqrt{3} \\ 3 & \sqrt{3} & \sqrt{3} & 1 \\ \sqrt{3} & 1 & 3 & \sqrt{3} \\ 1 & \sqrt{3} & \sqrt{3} & 3 \end{bmatrix}$ |
| 6 | $\frac{1}{4}\begin{bmatrix} 1 & \sqrt{3} & \sqrt{3} & 3 \\ \sqrt{3} & 1 & 3 & \sqrt{3} \\ 3 & \sqrt{3} & \sqrt{3} & 1 \\ \sqrt{3} & 3 & 1 & \sqrt{3} \end{bmatrix}$ |
| 7 | $\frac{1}{4}\begin{bmatrix} \sqrt{3} & 3 & 1 & \sqrt{3} \\ 3 & \sqrt{3} & \sqrt{3} & 3 \\ 1 & \sqrt{3} & \sqrt{3} & 1 \\ \sqrt{3} & 1 & 3 & \sqrt{3} \end{bmatrix}$ |
| 8 | $\frac{1}{4}\begin{bmatrix} 3 & \sqrt{3} & \sqrt{3} & 3 \\ \sqrt{3} & 1 & 3 & \sqrt{3} \\ \sqrt{3} & 3 & 1 & \sqrt{3} \\ 3 & \sqrt{3} & \sqrt{3} & 1 \end{bmatrix}$ |

CM codebooks, denoted by $CB_{cm}$ and NCM codebooks, denoted by $CB_{ncm}$, are provided by utilizing the set of CM and NCM matrices, respectively, given by Table 2 and Table 3.

A constant-modulus codebook $CB_{cm}$ with size 64 based on the proposed constant-modulus matrices $V_{cm}^n$ in Table 2 is provided. Meanwhile, by applying the chordal distance metric the method achieves a codebook with a nested property. This means that a new codebook with a desired size $s \leq 64$ can be obtained by using the first s precoders of the original codebook $CB_{cm}$. The nested property can reduce the storage and computation complexity associated with the CSI procedure in the closed-loop MIMO systems.

Second, a non-constant-modulus codebook $CB_{ncm}$ is constructed by applying an element-wise product between the proposed constant-modulus codebooks described in the preceding section and non-constant-modulus matrices $V_{ncm}^n$ given by Table 3. To this end, define a matrix set $U_{ncm}$ by properly selecting columns of NCM matrices $V_{ncm}^n$ given in Table 3. The non-constant-modulus codebook $CB_{ncm}$ is obtained by applying an element-wise product between $CB_{cm}$ and $U_{ncm}$ as follows:

$$CB_{ncm} = \{c_{cm} \odot u_{ncm} | c_{cm} \in CB_{cm}, u_{ncm} \in U_{ncm}\}$$

A constant-modulus codebook $CB_{cm}$ based on the proposed constant-modulus matrices $V_{cm}^n$ in Table 2 are presented. In particular, a set of precoders is created by using the columns of 16 CM matrices $V_{cm}^n$.

Let $CB_{cm}^r$ denote a constant-modulus codebook with rank r and $c_{cm}^{r,k}$ denote the k-th precoder of the codebook $CB_{cm}^r$. In one embodiment, the rank-1 codebook $CB_{cm}^1$ with 64 precoders is constructed by using the 64 column vectors of the 16 matrices $V_{cm}^n$ in Table 2. Then, the k-th precoder $c_{cm}^{r,k}$ can be given by $$c_{cm}^{r,k} = v_{cm}^{n,i} \text{ for } k=4(n-1)+i, n=1,\ldots,16, i=1,\ldots 4 \quad \text{Equation 7}$$

where $v_{cm}^{n,i}$ denotes i-th column of $V_{cm}^n$.

It is well known that under spatially-uncorrelated channel conditions, the codebook design problem can be formulated based on the chordal distance. For a pair of two precoder vectors or matrices $c_{cm}^{r,i}$ and $c_{cm}^{r,j}$, $i \neq j$, the chordal distance is defined by $$D_{cd}(c_{cm}^{r,i}, c_{cm}^{r,j}) = \|c_{cm}^{r,i} c_{cm}^{r,j H} - c_{cm}^{r,i} c_{cm}^{r,j H}\| \quad \text{Equation 8}$$

In one embodiment, by using the chordal distance metric, the precoders $c_{cm}^{r,k}$ generated from Equation 7 can be arranged in order to achieve a codebook with a nested property. This means that a new codebook $CB_{cm}^{1,s}$ with a desired size $s \leq 64$ can be obtained by using the first s precoders of the original codebook $CB_{cm}^1$, i.e., $CB_{cm}^{1,s} = [c_{cm}^{r,1}, c_{cm}^{r,2}, \ldots, c_{cm}^{r,s}]$. The nested property can reduce the storage and computation complexity associated with the CSI procedure in the closed-loop MIMO systems. Such a rank-1 codebook $CB_{cm}^1$ is given in Table 4.

The same chordal metric in Equation 8 is used to create the rank-2 and rank-3 codebooks.

In one embodiment, a rank-2 codebook $CB_{cm}^2$ can be obtained by successively choosing pairs of precoders $c_{cm}^{1,k}$ from $CB_{cm}^1$ given by Table 4 while maximizing the minimum chordal distance between any pair of precoders. The resulting 64 precoders for rank-2 are shown in Table 5 where $c_{cm}^{2,k}$ denotes the k-th precoder of the rank-2 codebook $CB_{cm}^2$ and $W_{\{m,n\}}^1 = [c_{cm}^{1,m}, c_{cm}^{1,n}]$ with $c_{cm}^{1,k}$ denoting the k-th precoder of the rank-1 codebook $CB_{cm}^1$ in Table 4. Similarly, a rank-3 codebook $CB_{cm}^3$ can be created. The rank-3 codebook is shown in Table 6, where $C_{cm}^{3,k}$ denotes the k-th precoder of rank-3 codebook and $W_{\{l,m,n\}}^1 = [c_{cm}^{1,l}, c_{cm}^{1,m}, c_{cm}^{1,n}]$ with $c_{cm}^{1,k}$ denoting the k-th precoder of the rank-1 codebook $CB_{cm}^1$ in Table 4.

In case of rank-4, a codebook $CB_{cm}^{54}$ with size 16 is readily given by a set of 16 matrices $v_{cm}^n$, $n=1,2,\ldots,16$, in Table 2. In one embodiment, the 16 matrices are sorted in decreasing order of the minimum chordal distance in order to construct a codebook with a nested property across sizes. For example, an iterative sorting strategy may be employed based on the chordal distance in Equation 8 and the list of newly ordered matrices is obtained as $$\{V_{cm}^1, V_{cm}^3, V_{cm}^2, V_{cm}^4, V_{cm}^{13}, V_{cm}^{14}, V_{cm}^{15}, V_{cm}^{16}, V_{cm}^5, V_{cm}^6, V_{cm}^7, V_{cm}^8, V_{cm}^9, V_{cm}^{10}, V_{cm}^{11}, V_{cm}^{12}\}$$

Finally, the resulting rank-4 codebook for 4 ports is shown in Table 7.

Note that a proper power normalization can be applied to the multi-rank codebooks given by Table 5, Table 6, and Table 7 with respect to its rank. In addition, each column of the precoding matrices given in the examples of Table 5, Table 6, and Table 7 can be independently scaled by its first element to have a common value without altering the chordal distance.

TABLE 4 proposed rank-1 codebook $CB_{cm}^1$ with precoders $c_{cm}^{1,k}$, $k = 1, \ldots, 64$, for rank-1 transmission on 4 ports with size s = 64

| Precoder index k | 1 | 2 | 3 | 4 | 5 | 6 |
|---|---|---|---|---|---|---|
| Precoder $c_{cm}^{1,k}$ | $\frac{1}{2}\begin{bmatrix}1\\1\\1\\1\end{bmatrix}$ | $\frac{1}{2}\begin{bmatrix}-1\\1\\-1\\1\end{bmatrix}$ | $\frac{1}{2}\begin{bmatrix}-1\\-1\\1\\1\end{bmatrix}$ | $\frac{1}{2}\begin{bmatrix}1\\-1\\-1\\1\end{bmatrix}$ | $\frac{1}{2}\begin{bmatrix}1\\1\\1\\-1\end{bmatrix}$ | $\frac{1}{2}\begin{bmatrix}-1\\1\\1\\1\end{bmatrix}$ |

| Precoder index k | 7 | 8 | 9 | 10 | 11 | 12 |
|---|---|---|---|---|---|---|
| Precoder $c_{cm}^{1,k}$ | $\frac{1}{2}\begin{bmatrix}-1\\-1\\1\\-1\end{bmatrix}$ | $\frac{1}{2}\begin{bmatrix}1\\-1\\1\\1\end{bmatrix}$ | $\frac{1}{2}\begin{bmatrix}1\\1\\-j\\-j\end{bmatrix}$ | $\frac{1}{2}\begin{bmatrix}-1\\1\\j\\-j\end{bmatrix}$ | $\frac{1}{2}\begin{bmatrix}-j\\-j\\1\\1\end{bmatrix}$ | $\frac{1}{2}\begin{bmatrix}j\\-j\\-1\\1\end{bmatrix}$ |

| Precoder index k | 13 | 14 | 15 | 16 | 17 | 18 |
|---|---|---|---|---|---|---|
| Precoder $c_{cm}^{1,k}$ | $\frac{1}{2}\begin{bmatrix}1\\1\\-j\\j\end{bmatrix}$ | $\frac{1}{2}\begin{bmatrix}-1\\1\\-j\\-j\end{bmatrix}$ | $\frac{1}{2}\begin{bmatrix}-j\\-j\\1\\-1\end{bmatrix}$ | $\frac{1}{2}\begin{bmatrix}j\\-j\\1\\1\end{bmatrix}$ | $\frac{1}{2}\begin{bmatrix}1\\-j\\1\\-j\end{bmatrix}$ | $\frac{1}{2}\begin{bmatrix}-j\\1\\-j\\1\end{bmatrix}$ |

| Precoder index k | 19 | 20 | 21 | 22 | 23 | 24 |
|---|---|---|---|---|---|---|
| Precoder $c_{cm}^{1,k}$ | $\frac{1}{2}\begin{bmatrix}-1\\j\\1\\-j\end{bmatrix}$ | $\frac{1}{2}\begin{bmatrix}j\\-1\\-j\\1\end{bmatrix}$ | $\frac{1}{2}\begin{bmatrix}1\\-j\\-j\\-1\end{bmatrix}$ | $\frac{1}{2}\begin{bmatrix}-j\\1\\-1\\-j\end{bmatrix}$ | $\frac{1}{2}\begin{bmatrix}-j\\-1\\1\\-j\end{bmatrix}$ | $\frac{1}{2}\begin{bmatrix}-1\\-j\\-j\\1\end{bmatrix}$ |

TABLE 4-continued proposed rank-1 codebook $CB_{cm}^1$ with precoders $c_{cm}^{1,k}$, k = 1, ..., 64, for rank-1 transmission on 4 ports with size s = 64

| Precoder index k | 25 | 26 | 27 | 28 | 29 | 30 |
|---|---|---|---|---|---|---|
| Precoder $c_{cm}^{1,k}$ | $\frac{1}{2}\begin{bmatrix} 1 \\ -j \\ 1 \\ j \end{bmatrix}$ | $\frac{1}{2}\begin{bmatrix} -j \\ 1 \\ j \\ 1 \end{bmatrix}$ | $\frac{1}{2}\begin{bmatrix} -1 \\ j \\ 1 \\ j \end{bmatrix}$ | $\frac{1}{2}\begin{bmatrix} j \\ -1 \\ j \\ 1 \end{bmatrix}$ | $\frac{1}{2}\begin{bmatrix} 1 \\ -j \\ -j \\ 1 \end{bmatrix}$ | $\frac{1}{2}\begin{bmatrix} -j \\ 1 \\ 1 \\ -j \end{bmatrix}$ |

| Precoder index k | 31 | 32 | 33 | 34 | 35 | 36 |
|---|---|---|---|---|---|---|
| Precoder $c_{cm}^{1,k}$ | $\frac{1}{2}\begin{bmatrix} -j \\ -1 \\ 1 \\ j \end{bmatrix}$ | $\frac{1}{2}\begin{bmatrix} -1 \\ -j \\ j \\ 1 \end{bmatrix}$ | $\frac{1}{2}\begin{bmatrix} 1 \\ 1 \\ 1 \\ j \end{bmatrix}$ | $\frac{1}{2}\begin{bmatrix} -1 \\ 1 \\ -j \\ 1 \end{bmatrix}$ | $\frac{1}{2}\begin{bmatrix} -1 \\ -1 \\ 1 \\ -j \end{bmatrix}$ | $\frac{1}{2}\begin{bmatrix} 1 \\ -1 \\ -j \\ 1 \end{bmatrix}$ |

| Precoder index k | 37 | 38 | 39 | 40 | 41 | 42 |
|---|---|---|---|---|---|---|
| Precoder $c_{cm}^{1,k}$ | $\frac{1}{2}\begin{bmatrix} 1 \\ 1 \\ -j \\ -1 \end{bmatrix}$ | $\frac{1}{2}\begin{bmatrix} -1 \\ 1 \\ -1 \\ -j \end{bmatrix}$ | $\frac{1}{2}\begin{bmatrix} -j \\ -j \\ 1 \\ -j \end{bmatrix}$ | $\frac{1}{2}\begin{bmatrix} j \\ -j \\ -j \\ 1 \end{bmatrix}$ | $\frac{1}{2}\begin{bmatrix} 1 \\ 1 \\ 1 \\ j \end{bmatrix}$ | $\frac{1}{2}\begin{bmatrix} -1 \\ 1 \\ j \\ 1 \end{bmatrix}$ |

| Precoder index k | 43 | 44 | 45 | 46 | 47 | 48 |
|---|---|---|---|---|---|---|
| Precoder $c_{cm}^{1,k}$ | $\frac{1}{2}\begin{bmatrix} -1 \\ -1 \\ 1 \\ j \end{bmatrix}$ | $\frac{1}{2}\begin{bmatrix} 1 \\ -1 \\ j \\ 1 \end{bmatrix}$ | $\frac{1}{2}\begin{bmatrix} 1 \\ 1 \\ -j \\ 1 \end{bmatrix}$ | $\frac{1}{2}\begin{bmatrix} -1 \\ 1 \\ 1 \\ -j \end{bmatrix}$ | $\frac{1}{2}\begin{bmatrix} -j \\ -j \\ 1 \\ j \end{bmatrix}$ | $\frac{1}{2}\begin{bmatrix} j \\ -j \\ j \\ 1 \end{bmatrix}$ |

| Precoder index k | 49 | 50 | 51 | 52 | 53 | 54 |
|---|---|---|---|---|---|---|
| Precoder $c_{cm}^{1,k}$ | $\frac{1}{2}\begin{bmatrix} 1 \\ -j \\ 1 \\ 1 \end{bmatrix}$ | $\frac{1}{2}\begin{bmatrix} -j \\ 1 \\ -1 \\ 1 \end{bmatrix}$ | $\frac{1}{2}\begin{bmatrix} -1 \\ j \\ 1 \\ 1 \end{bmatrix}$ | $\frac{1}{2}\begin{bmatrix} j \\ -1 \\ -1 \\ 1 \end{bmatrix}$ | $\frac{1}{2}\begin{bmatrix} 1 \\ -j \\ -j \\ -j \end{bmatrix}$ | $\frac{1}{2}\begin{bmatrix} -j \\ 1 \\ j \\ -j \end{bmatrix}$ |

| Precoder index k | | 55 | 56 | 57 | 58 | 59 |
|---|---|---|---|---|---|---|
| Precoder $c_{cm}^{1,k}$ | | $\frac{1}{2}\begin{bmatrix} -j \\ -1 \\ 1 \\ 1 \end{bmatrix}$ | $\frac{1}{2}\begin{bmatrix} -1 \\ -j \\ -1 \\ 1 \end{bmatrix}$ | $\frac{1}{2}\begin{bmatrix} 1 \\ -j \\ 1 \\ -1 \end{bmatrix}$ | $\frac{1}{2}\begin{bmatrix} -j \\ 1 \\ 1 \\ 1 \end{bmatrix}$ | $\frac{1}{2}\begin{bmatrix} -1 \\ j \\ 1 \\ -1 \end{bmatrix}$ |

| Precoder index k | | 60 | 61 | 62 | 63 | 64 |
|---|---|---|---|---|---|---|
| Precoder $c_{cm}^{1,k}$ | | $\frac{1}{2}\begin{bmatrix} j \\ -1 \\ 1 \\ 1 \end{bmatrix}$ | $\frac{1}{2}\begin{bmatrix} 1 \\ -j \\ -j \\ j \end{bmatrix}$ | $\frac{1}{2}\begin{bmatrix} -j \\ 1 \\ -j \\ -j \end{bmatrix}$ | $\frac{1}{2}\begin{bmatrix} -j \\ -1 \\ 1 \\ -1 \end{bmatrix}$ | $\frac{1}{2}\begin{bmatrix} -1 \\ -j \\ 1 \\ 1 \end{bmatrix}$ |

TABLE 5 proposed rank-2 codebook $CB_{cm}^2$ with precoders $c_{cm}^{2,k}$, k = 1, ..., 64, for rank-2 transmission on four ports with size s = 64, where $W_{\{m,n\}}^1 = [c_{cm}^{1,m}, c_{cm}^{1,n}]$

| Precoder index k | 1 | 2 | 3 | 4 | 5 | 6 | 7 | 8 |
|---|---|---|---|---|---|---|---|---|
| Precoder $c_{cm}^{2,k}$ | $W_{\{1,2\}}^1$ | $W_{\{3,4\}}^1$ | $W_{\{1,3\}}^1$ | $W_{\{1,4\}}^1$ | $W_{\{2,3\}}^1$ | $W_{\{2,4\}}^1$ | $W_{\{5,6\}}^1$ | $W_{\{5,7\}}^1$ |

TABLE 5-continued proposed rank-2 codebook $CB_{cm}^2$ with precoders $c_{cm}^{2,k}$, k = 1, ..., 64, for rank-2 transmission on four ports with size s = 64, where $W_{\{m,n\}}^1 = [c_{cm}^{1,m}, c_{cm}^{1,n}]$

| Precoder index k | 9 | 10 | 11 | 12 | 13 | 14 | 15 | 16 |
|---|---|---|---|---|---|---|---|---|
| Precoder $c_{cm}^{2,k}$ | $W_{\{5,8\}}^1$ | $W_{\{6,7\}}^1$ | $W_{\{6,8\}}^1$ | $W_{\{7,8\}}^1$ | $W_{\{9,10\}}^1$ | $W_{\{9,12\}}^1$ | $W_{\{10,11\}}^1$ | $W_{\{11,12\}}^1$ |

| Precoder index k | 17 | 18 | 19 | 20 | 21 | 22 | 23 | 24 |
|---|---|---|---|---|---|---|---|---|
| Precoder $c_{cm}^{2,k}$ | $W_{\{13,14\}}^1$ | $W_{\{13,16\}}^1$ | $W_{\{14,15\}}^1$ | $W_{\{15,16\}}^1$ | $W_{\{17,19\}}^1$ | $W_{\{18,20\}}^1$ | $W_{\{25,127\}}^1$ | $W_{\{26,28\}}^1$ |

| Precoder index k | 25 | 26 | 27 | 28 | 29 | 30 | 31 | 32 |
|---|---|---|---|---|---|---|---|---|
| Precoder $c_{cm}^{2,k}$ | $W_{\{33,34\}}^1$ | $W_{\{33,35\}}^1$ | $W_{\{33,36\}}^1$ | $W_{\{34,35\}}^1$ | $W_{\{34,36\}}^1$ | $W_{\{35,36\}}^1$ | $W_{\{37,38\}}^1$ | $W_{\{37,40\}}^1$ |

| Precoder index k | 33 | 34 | 35 | 36 | 37 | 38 | 39 | 40 |
|---|---|---|---|---|---|---|---|---|
| Precoder $c_{cm}^{2,k}$ | $W_{\{38,39\}}^1$ | $W_{\{39,40\}}^1$ | $W_{\{41,42\}}^1$ | $W_{\{41,43\}}^1$ | $W_{\{41,44\}}^1$ | $W_{\{42,43\}}^1$ | $W_{\{42,44\}}^1$ | $W_{\{43,44\}}^1$ |

| Precoder index k | 41 | 42 | 43 | 44 | 45 | 46 | 47 | 48 |
|---|---|---|---|---|---|---|---|---|
| Precoder $c_{cm}^{2,k}$ | $W_{\{45,46\}}^1$ | $W_{\{45,48\}}^1$ | $W_{\{46,47\}}^1$ | $W_{\{47,48\}}^1$ | $W_{\{49,50\}}^1$ | $W_{\{49,51\}}^1$ | $W_{\{49,52\}}^1$ | $W_{\{50,51\}}^1$ |

| Precoder index k | 49 | 50 | 51 | 52 | 53 | 54 | 55 | 56 |
|---|---|---|---|---|---|---|---|---|
| Precoder $c_{cm}^{2,k}$ | $W_{\{50,52\}}^1$ | $W_{\{51,52\}}^1$ | $W_{\{53,54\}}^1$ | $W_{\{53,56\}}^1$ | $W_{\{54,55\}}^1$ | $W_{\{55,56\}}^1$ | $W_{\{57,58\}}^1$ | $W_{\{57,59\}}^1$ |

| Precoder index k | 57 | 58 | 59 | 60 | 61 | 62 | 63 | 64 |
|---|---|---|---|---|---|---|---|---|
| Precoder $c_{cm}^{2,k}$ | $W_{\{57,60\}}^1$ | $W_{\{58,59\}}^1$ | $W_{\{58,60\}}^1$ | $W_{\{59,60\}}^1$ | $W_{\{61,62\}}^1$ | $W_{\{61,64\}}^1$ | $W_{\{62,63\}}^1$ | $W_{\{63,64\}}^1$ |

TABLE 6

Proposed rank-3 codebook $CB_{cm}^3$ with precoders $c_{cm}^{3,k}$, k = 1, ..., 64, for rank-3 transmission on 4 ports with size s = 64, where $W_{\{1,m,n\}}^1 = [c_{cm}^{1,l}\ c_{cm}^{1,m}\ c_{cm}^{1,n}]$

| Precoder index k | 1 | 2 | 3 | 4 | 5 | 6 | 7 | 8 |
|---|---|---|---|---|---|---|---|---|
| Precoder $c_{cm}^{3,k}$ | $W_{\{2,3,4\}}^1$ | $W_{\{1,3,4\}}^1$ | $W_{\{1,2,4\}}^1$ | $W_{\{1,2,3\}}^1$ | $W_{\{6,7,8\}}^1$ | $W_{\{5,7,8\}}^1$ | $W_{\{5,6,8\}}^1$ | $W_{\{5,6,7\}}^1$ |

| Precoder index k | 9 | 10 | 11 | 12 | 13 | 14 | 15 | 16 |
|---|---|---|---|---|---|---|---|---|
| Precoder $c_{cm}^{3,k}$ | $W_{\{10,11,12\}}^1$ | $W_{\{9,11,12\}}^1$ | $W_{\{9,10,12\}}^1$ | $W_{\{9,10,11\}}^1$ | $W_{\{14,15,16\}}^1$ | $W_{\{13,15,16\}}^1$ | $W_{\{13,14,16\}}^1$ | $W_{\{13,14,15\}}^1$ |

| Precoder index k | 17 | 18 | 19 | 20 | 21 | 22 | 23 | 24 |
|---|---|---|---|---|---|---|---|---|
| Precoder $c_{cm}^{3,k}$ | $W_{\{18,19,20\}}^1$ | $W_{\{17,19,20\}}^1$ | $W_{\{17,18,20\}}^1$ | $W_{\{17,18,19\}}^1$ | $W_{\{22,23,24\}}^1$ | $W_{\{21,23,24\}}^1$ | $W_{\{21,22,24\}}^1$ | $W_{\{21,22,23\}}^1$ |

| Precoder index k | 25 | 26 | 27 | 28 | 29 | 30 | 31 | 32 |
|---|---|---|---|---|---|---|---|---|
| Precoder $c_{cm}^{3,k}$ | $W_{\{26,27,28\}}^1$ | $W_{\{25,27,28\}}^1$ | $W_{\{25,26,28\}}^1$ | $W_{\{25,26,27\}}^1$ | $W_{\{30,31,32\}}^1$ | $W_{\{29,31,32\}}^1$ | $W_{\{29,30,32\}}^1$ | $W_{\{29,30,31\}}^1$ |

TABLE 6-continued

Proposed rank-3 codebook $CB_{cm}^3$ with precoders $c_{cm}^{3,k}$, k = 1, . . . , 64, for rank-3 transmission on 4 ports with size s = 64, where = $W_{\{1,m.n\}}^1 = [c_{cm}^{1,l} \, c_{cm}^{1,m} \, c_{cm}^{1,n}]$

| Precoder index k | 33 | 34 | 35 | 36 | 37 | 38 | 39 | 40 |
|---|---|---|---|---|---|---|---|---|
| Precoder $c_{cm}^{3,k}$ | $W_{\{34,35,36\}}^1$ | $W_{\{33,35,36\}}^1$ | $W_{\{33,34,36\}}^1$ | $W_{\{33,34,35\}}^1$ | $W_{\{38,39,40\}}^1$ | $W_{\{37,39,40\}}^1$ | $W_{\{37,38,40\}}^1$ | $W_{\{37,38,39\}}^1$ |

| Precoder index k | 41 | 42 | 43 | 44 | 45 | 46 | 47 | 48 |
|---|---|---|---|---|---|---|---|---|
| Precoder $c_{cm}^{3,k}$ | $W_{\{42,43,44\}}^1$ | $W_{\{41,43,44\}}^1$ | $W_{\{41,42,44\}}^1$ | $W_{\{41,42,43\}}^1$ | $W_{\{46,47,48\}}^1$ | $W_{\{45,47,48\}}^1$ | $W_{\{45,46,48\}}^1$ | $W_{\{45,46,47\}}^1$ |

| Precoder index k | 49 | 50 | 51 | 52 | 53 | 54 | 55 | 56 |
|---|---|---|---|---|---|---|---|---|
| Precoder $c_{cm}^{3,k}$ | $W_{\{50,51,52\}}^1$ | $W_{\{49,51,52\}}^1$ | $W_{\{49,50,52\}}^1$ | $W_{\{49,50,51\}}^1$ | $W_{\{54,55,56\}}^1$ | $W_{\{53,55,56\}}^1$ | $W_{\{53,54,56\}}^1$ | $W_{\{53,54,55\}}^1$ |

| Precoder index k | 57 | 58 | 59 | 60 | 61 | 62 | 63 | 64 |
|---|---|---|---|---|---|---|---|---|
| Precoder $c_{cm}^{3,k}$ | $W_{\{58,59,60\}}^1$ | $W_{\{57,59,60\}}^1$ | $W_{\{57,58,60\}}^1$ | $W_{\{57,58,59\}}^1$ | $W_{\{62,63,64\}}^1$ | $W_{\{61,63,64\}}^1$ | $W_{\{61,62,64\}}^1$ | $W_{\{61,62,63\}}^1$ |

TABLE 7 proposed rank-4 codebook $CB_{cm}^4$ with precoders, $c_{cm}^{4,k}$, k = 1, . . . ,16, for rank-4 transmission on 4 ports with size s = 16

| Precoder index k | 1 | 2 | 3 | 4 |
|---|---|---|---|---|
| Precoder $c_{cm}^{4,k}$ | $\frac{1}{2}\begin{bmatrix} 1 & -1 & -1 & 1 \\ 1 & 1 & -1 & -1 \\ 1 & -1 & 1 & -1 \\ 1 & 1 & 1 & 1 \end{bmatrix}$ | $\frac{1}{2}\begin{bmatrix} 1 & -1 & -1 & 1 \\ 1 & 1 & -1 & -1 \\ 1 & 1 & 1 & 1 \\ -1 & 1 & -1 & 1 \end{bmatrix}$ | $\frac{1}{2}\begin{bmatrix} 1 & -1 & -j & j \\ 1 & 1 & -j & -j \\ -j & j & 1 & -1 \\ -j & -j & 1 & 1 \end{bmatrix}$ | $\frac{1}{2}\begin{bmatrix} 1 & -1 & -j & j \\ 1 & 1 & -j & -j \\ -j & -j & 1 & 1 \\ j & -j & -1 & 1 \end{bmatrix}$ |

| Precoder index k | 5 | 6 | 7 | 8 |
|---|---|---|---|---|
| Precoder $c_{cm}^{4,k}$ | $\frac{1}{2}\begin{bmatrix} 1 & -j & -1 & j \\ -j & 1 & j & -1 \\ 1 & -j & 1 & -j \\ -j & 1 & -j & 1 \end{bmatrix}$ | $\frac{1}{2}\begin{bmatrix} 1 & -j & -j & -1 \\ -j & 1 & -1 & -j \\ -j & -1 & 1 & -j \\ -1 & -j & -j & 1 \end{bmatrix}$ | $\frac{1}{2}\begin{bmatrix} 1 & -j & -1 & j \\ -j & 1 & j & -1 \\ 1 & j & 1 & j \\ j & 1 & j & 1 \end{bmatrix}$ | $\frac{1}{2}\begin{bmatrix} 1 & -j & -j & -1 \\ -j & 1 & -1 & -j \\ -j & 1 & 1 & j \\ 1 & -j & j & 1 \end{bmatrix}$ |

| Precoder index k | 9 | 10 | 11 | 12 |
|---|---|---|---|---|
| Precoder $c_{cm}^{4,k}$ | $\frac{1}{2}\begin{bmatrix} 1 & -1 & -1 & 1 \\ 1 & 1 & -1 & -1 \\ 1 & -j & 1 & -j \\ -j & 1 & -j & 1 \end{bmatrix}$ | $\frac{1}{2}\begin{bmatrix} 1 & -1 & -j & j \\ 1 & 1 & -j & -j \\ -j & -1 & 1 & -j \\ -1 & -j & -j & 1 \end{bmatrix}$ | $\frac{1}{2}\begin{bmatrix} 1 & -1 & -1 & 1 \\ 1 & 1 & -1 & -1 \\ 1 & j & 1 & j \\ j & 1 & j & 1 \end{bmatrix}$ | $\frac{1}{2}\begin{bmatrix} 1 & -1 & -j & j \\ 1 & 1 & -j & -j \\ -j & 1 & 1 & j \\ 1 & -j & j & 1 \end{bmatrix}$ |

| Precoder index k | 13 | 14 | 15 | 16 |
|---|---|---|---|---|
| Precoder $c_{cm}^{4,k}$ | $\frac{1}{2}\begin{bmatrix} 1 & -j & -1 & j \\ -j & 1 & j & -1 \\ 1 & -1 & 1 & -1 \\ 1 & 1 & 1 & 1 \end{bmatrix}$ | $\frac{1}{2}\begin{bmatrix} 1 & -j & -j & -1 \\ -j & 1 & -1 & -j \\ -j & j & 1 & -1 \\ -j & -j & 1 & 1 \end{bmatrix}$ | $\frac{1}{2}\begin{bmatrix} 1 & -j & -1 & j \\ -j & 1 & j & -1 \\ 1 & 1 & 1 & 1 \\ -1 & 1 & -1 & 1 \end{bmatrix}$ | $\frac{1}{2}\begin{bmatrix} 1 & -j & -j & -1 \\ -j & 1 & -1 & -j \\ -j & -j & 1 & 1 \\ j & -j & -1 & 1 \end{bmatrix}$ |

The non-constant-modulus codebook $CB_{ncm}$ can be obtained by applying element-wise product between the proposed constant-modulus codebooks described in the preceding section and non-constant-modulus matrices $V_{ncm}^n$ given by Table 3.

To this end, define four matrix sets $U_{ncm}^r$ with rank r, r=1,2,3,4, by properly selecting r columns of each NCM matrix $V_{ncm}^n$ given in Table 3. The four sets $U_{ncm}^1$, $U_{ncm}^2$, $U_{ncm}^3$ and $U_{ncm}^4$ are given in Table 8, Table 9, Table 10, and Table 11, where $u_{ncm}^{r,i}$, denotes i-th element of $U_{ncm}^r$.

Let $CB_{ncm}^r$ denote a non-constant-modulus codebook with rank r. In an embodiment, a rank-1 NCM codebook $CB_{ncm}^1$ with size 512 is achieved by the component-wise product between 64 precoders $c_{cm}^{1,k} \in CB_{cm}^1$ in Table 4 and 8 rank-1 matrices $u_{ncm}^{1,i} \in U_{ncm}^1$ in Table 8 as follows $$CB_{ncm}^1 = \{c_{cm}^{1,k} \odot u_{ncm}^{1,i} | c_{ncm}^{1,k} \in CB_{cm}^{1,k}, u_{ncm}^{1,i} \in U_{ncm}^1\}$$

Equation 9

In an embodiment, a rank-2 NCM codebook $CB_{ncm}^2$ with size 512 is achieved by the component-wise product between 64 precoders $c_{cm}^{2,k} \in CB_{cm}^2$ in Table 5 and 8 rank-2 matrices $u_{ncm}^{2,i} \in U_{ncm}^2$ in Table 9 as follows:

$$CB_{ncm}^2 = \{c_{cm}^{2,k} \odot u_{ncm}^{2,i} | c_{ncm}^{2,k} \in CB_{cm}^{2,k}, u_{ncm}^{2,i} \in U_{ncm}^2\}$$

Equation 10

In an embodiment, a rank-3 NCM codebook $CB_{ncm}^3$ with size 512 is achieved by the component-wise product between 64 precoders $C_{cm}^{3,k} \in CB_{cm}^3$ in Table 6 and 8 rank-3 matrices $u_{ncm}^{3,i} \in U_{ncm}^3$ in Table 10 as follows $$CB_{ncm}^3 = \{c_{cm}^{3,k} \odot u_{ncm}^{3,i} | c_{ncm}^{3,k} \in CB_{cm}^{3,k}, u_{ncm}^{3,i} \in U_{ncm}^3\}$$

Equation 11

In an embodiment, a rank-4 NCM codebook $CB_{ncm}^4$ with size 128 is achieved by the component-wise product between 16 precoders $C_{cm}^{4,k} \in CB_{cm}^4$ in Table 7 and 8 rank-4 matrices $u_{ncm}^{4,i} \in U_{ncm}^4$ in Table 11 as follows $$CB_{ncm}^4 = \{c_{cm}^{4,k} \odot u_{ncm}^{4,i} | c_{ncm}^{4,k} \in CB_{cm}^{4,k}, u_{ncm}^{4,i} \in U_{ncm}^4\}$$

Equation 12

TABLE 8

Set of non-constant modulus rank-1 matrices $U_{ncm}^1$ with size 8

| Index i | 1 | 2 | 3 | 4 |
|---|---|---|---|---|
| matrix $u_{ncm}^{1,i}$ | $\begin{bmatrix} 3 \\ \sqrt{3} \\ \sqrt{3} \\ 1 \end{bmatrix}$ | $\begin{bmatrix} \sqrt{3} \\ 1 \\ 3 \\ \sqrt{3} \end{bmatrix}$ | $\begin{bmatrix} 3 \\ \sqrt{3} \\ 1 \\ \sqrt{3} \end{bmatrix}$ | $\begin{bmatrix} \sqrt{3} \\ 1 \\ \sqrt{3} \\ 3 \end{bmatrix}$ |

TABLE 8-continued

Set of non-constant modulus rank-1 matrices $U_{ncm}^1$ with size 8

| Index i | 5 | 6 | 7 | 8 |
|---|---|---|---|---|
| matrix $u_{ncm}^{1,i}$ | $\begin{bmatrix} \sqrt{3} \\ 3 \\ \sqrt{3} \\ 1 \end{bmatrix}$ | $\begin{bmatrix} 1 \\ \sqrt{3} \\ 3 \\ \sqrt{3} \end{bmatrix}$ | $\begin{bmatrix} \sqrt{3} \\ 3 \\ 1 \\ \sqrt{3} \end{bmatrix}$ | $\begin{bmatrix} 3 \\ \sqrt{3} \\ \sqrt{3} \\ 3 \end{bmatrix}$ |

TABLE 9

Set of non-constant modulus rank-2 matrices $U_{ncm}^2$ with size 8

| Index i | 1 | 2 | 3 | 4 |
|---|---|---|---|---|
| matrix $u_{ncm}^{2,i}$ | $\frac{1}{4}\begin{bmatrix} 3 & \sqrt{3} \\ \sqrt{3} & 1 \\ \sqrt{3} & 3 \\ 1 & \sqrt{3} \end{bmatrix}$ | $\frac{1}{4}\begin{bmatrix} \sqrt{3} & 3 \\ 1 & \sqrt{3} \\ 3 & \sqrt{3} \\ \sqrt{3} & 1 \end{bmatrix}$ | $\frac{1}{4}\begin{bmatrix} 3 & \sqrt{3} \\ \sqrt{3} & 1 \\ 1 & \sqrt{3} \\ \sqrt{3} & 3 \end{bmatrix}$ | $\frac{1}{4}\begin{bmatrix} \sqrt{3} & 3 \\ 1 & \sqrt{3} \\ \sqrt{3} & 1 \\ 3 & \sqrt{3} \end{bmatrix}$ |

| Index i | 5 | 6 | 7 | 8 |
|---|---|---|---|---|
| matrix $u_{ncm}^{2,i}$ | $\frac{1}{4}\begin{bmatrix} \sqrt{3} & 1 \\ 3 & \sqrt{3} \\ \sqrt{3} & 3 \\ 1 & \sqrt{3} \end{bmatrix}$ | $\frac{1}{4}\begin{bmatrix} 1 & \sqrt{3} \\ \sqrt{3} & 3 \\ 3 & \sqrt{3} \\ \sqrt{3} & 1 \end{bmatrix}$ | $\frac{1}{4}\begin{bmatrix} \sqrt{3} & 1 \\ 3 & \sqrt{3} \\ 1 & \sqrt{3} \\ \sqrt{3} & 3 \end{bmatrix}$ | $\frac{1}{4}\begin{bmatrix} 3 & \sqrt{3} \\ \sqrt{3} & 3 \\ \sqrt{3} & 1 \\ 3 & \sqrt{3} \end{bmatrix}$ |

TABLE 10

Set of non-constant modulus rank-3 matrices $U_{ncm}^3$ with size 8

| Index i | 1 | 2 | 3 | 4 |
|---|---|---|---|---|
| matrix $u_{ncm}^{3,i}$ | $\frac{1}{4}\begin{bmatrix} 3 & \sqrt{3} & \sqrt{3} \\ \sqrt{3} & 3 & 1 \\ \sqrt{3} & 1 & 3 \\ 1 & \sqrt{3} & \sqrt{3} \end{bmatrix}$ | $\frac{1}{4}\begin{bmatrix} \sqrt{3} & 1 & 3 \\ 1 & \sqrt{3} & \sqrt{3} \\ 3 & \sqrt{3} & \sqrt{3} \\ \sqrt{3} & 3 & 1 \end{bmatrix}$ | $\frac{1}{4}\begin{bmatrix} 3 & \sqrt{3} & \sqrt{3} \\ \sqrt{3} & 3 & 1 \\ 1 & \sqrt{3} & \sqrt{3} \\ \sqrt{3} & 1 & 3 \end{bmatrix}$ | $\frac{1}{4}\begin{bmatrix} \sqrt{3} & 1 & 3 \\ 1 & \sqrt{3} & \sqrt{3} \\ \sqrt{3} & 3 & 1 \\ 3 & \sqrt{3} & \sqrt{3} \end{bmatrix}$ |

| Index i | 5 | 6 | 7 | 8 |
|---|---|---|---|---|
| matrix $u_{ncm}^{3,i}$ | $\frac{1}{4}\begin{bmatrix} \sqrt{3} & 3 & 1 \\ 3 & \sqrt{3} & \sqrt{3} \\ \sqrt{3} & 1 & 3 \\ 1 & \sqrt{3} & \sqrt{3} \end{bmatrix}$ | $\frac{1}{4}\begin{bmatrix} 1 & \sqrt{3} & \sqrt{3} \\ \sqrt{3} & 1 & 3 \\ 3 & \sqrt{3} & \sqrt{3} \\ \sqrt{3} & 3 & 1 \end{bmatrix}$ | $\frac{1}{4}\begin{bmatrix} \sqrt{3} & 3 & 1 \\ 3 & \sqrt{3} & \sqrt{3} \\ 1 & \sqrt{3} & \sqrt{3} \\ \sqrt{3} & 1 & 3 \end{bmatrix}$ | $\frac{1}{4}\begin{bmatrix} 3 & \sqrt{3} & \sqrt{3} \\ \sqrt{3} & 1 & 3 \\ \sqrt{3} & 3 & 1 \\ 3 & \sqrt{3} & \sqrt{3} \end{bmatrix}$ |

TABLE 11

Set of non-constant modulus rank-4 matrices $U_{ncm}^4$ with size 8

| Index i | 1 | 2 | 3 | 4 |
|---|---|---|---|---|
| matrix $u_{ncm}^{4,i}$ | $\frac{1}{4}\begin{bmatrix} 3 & \sqrt{3} & \sqrt{3} & 1 \\ \sqrt{3} & 3 & 1 & \sqrt{3} \\ \sqrt{3} & 1 & 3 & \sqrt{3} \\ 1 & \sqrt{3} & \sqrt{3} & 3 \end{bmatrix}$ | $\frac{1}{4}\begin{bmatrix} \sqrt{3} & 1 & 3 & \sqrt{3} \\ 1 & \sqrt{3} & \sqrt{3} & 3 \\ 3 & \sqrt{3} & \sqrt{3} & 1 \\ \sqrt{3} & 3 & 1 & \sqrt{3} \end{bmatrix}$ | $\frac{1}{4}\begin{bmatrix} 3 & \sqrt{3} & \sqrt{3} & 1 \\ \sqrt{3} & 3 & 1 & \sqrt{3} \\ 1 & \sqrt{3} & \sqrt{3} & 3 \\ \sqrt{3} & 1 & 3 & \sqrt{3} \end{bmatrix}$ | $\frac{1}{4}\begin{bmatrix} \sqrt{3} & 1 & 3 & \sqrt{3} \\ 1 & \sqrt{3} & \sqrt{3} & 3 \\ \sqrt{3} & 3 & 1 & \sqrt{3} \\ 3 & \sqrt{3} & \sqrt{3} & 1 \end{bmatrix}$ |

TABLE 11-continued

Set of non-constant modulus rank-4 matrices $U_{ncm}^4$ with size 8

| Index i | 5 | 6 | 7 | 8 |
|---|---|---|---|---|
| matrix $u_{ncm}^{4,i}$ | $\frac{1}{4}\begin{bmatrix} \sqrt{3} & 3 & 1 & \sqrt{3} \\ 3 & \sqrt{3} & \sqrt{3} & 1 \\ \sqrt{3} & 1 & 3 & \sqrt{3} \\ 1 & \sqrt{3} & \sqrt{3} & 3 \end{bmatrix}$ | $\frac{1}{4}\begin{bmatrix} 1 & \sqrt{3} & \sqrt{3} & 3 \\ \sqrt{3} & 1 & 3 & \sqrt{3} \\ 3 & \sqrt{3} & \sqrt{3} & 1 \\ \sqrt{3} & 3 & 1 & \sqrt{3} \end{bmatrix}$ | $\frac{1}{4}\begin{bmatrix} \sqrt{3} & 3 & 1 & \sqrt{3} \\ 3 & \sqrt{3} & \sqrt{3} & 3 \\ 1 & \sqrt{3} & \sqrt{3} & 1 \\ \sqrt{3} & 1 & 3 & \sqrt{3} \end{bmatrix}$ | $\frac{1}{4}\begin{bmatrix} 3 & \sqrt{3} & \sqrt{3} & 3 \\ \sqrt{3} & 1 & 3 & \sqrt{3} \\ \sqrt{3} & 3 & 1 & \sqrt{3} \\ 3 & \sqrt{3} & \sqrt{3} & 1 \end{bmatrix}$ |

In embodiments herein, the terms precoder and precoding matrix are used interchangeably.

The channel decomposition V using an element-wise product of two component matrices from Equation 3 may use an alternative constant modulus matrix to the one described by Equation 4. One such alternative is to use a predefined constant codebook such as one available in 3GPP NR Release 15 in 3GPP Technical Standard (TS) 38.211 section 6.3.1.5. For example, the precoder matrices in Tables 6.3.1.5-1 through 6.3.1.5-7 of this TS are all constant modulus matrices. Many of these precoder matrices also indicate transmission of more than one antenna port on a layer, in which case the relative phase of the antenna ports is also provided by the elements of the precoding matrix.

One benefit of using a non-constant modulus precoding matrix derived from a 3GPP NR codebook is that a WD can operate in networks that already support the 3GPP codebooks, but that do not yet support the non-constant modulus precoding matrices, but on the other hand still have the higher efficiency when operating in networks that do support the new non-constant modulus precoders. Operation with the constant modulus precoders in networks supporting non-constant modulus codebooks can also have the benefit of allowing the WD power amplifiers to operate with lower peak to average power in a constant modulus mode of operation, thereby enabling higher power amplifier efficiency.

It may be observed that each 3GPP NR Release 15 precoder is associated with a number of layers. Therefore a non-constant modulus precoder can be constructed by applying a real valued scaling factor to an element of a Release 15 precoder corresponding to an antenna port and layer. A non-constant modulus precoder can then be indicated to the WD by indicating a Release 15 precoder and a corresponding non-constant modulus that scales the Release 15 precoder with an element-wise product.

Therefore, in an embodiment, a WD can be configured to operate in a constant modulus mode of operation or in a non-constant modulus mode of operation. In the first mode of operation, a precoder formed from a constant modulus matrix is used to transmit a physical channel, while in the second mode the precoder is formed as the product of the constant modulus matrix and a non-constant modulus matrix. In some embodiments, the constant modulus matrix is a precoding matrix from 3GPP TS 38.211 rev. 16.0.0 section 6.3.1.5 and the product of the constant modulus matrix and the non-constant modulus matrix is an element-wise product.

The optimal decomposition of a channel matrix is represented by a component-wise product of two component matrices $V_{cm}$ and $V_{ncm}$. The first matrix $K_{in}$ has a property that all the elements of the matrix have one value out of four values $\{1, -1, j, -j\}$. The second matrix $V_{ncm}$ has a property that all the columns of the matrix have the same norm value. The constant-modulus codebook $CB_{cm}$ is derived based on a finite set of the constant-modulus matrices $V_{cm}$. The non-constant-modulus codebook $CB_{ncm}$ is derived by a component-wise product between the non-modulus codebook and a finite set of non-constant-modulus matrices $V_{ncm}$.

A finite set of the first component matrices $V_{cm}$ is given by $$V_{cm} \in \left\{ \begin{bmatrix} M^\alpha_{1,1} & M^\alpha_{1,2} & 0 & 0 \\ M^\alpha_{2,1} & M^\alpha_{2,2} & 0 & 0 \\ 0 & 0 & M^\beta_{1,1} & M^\beta_{1,2} \\ 0 & 0 & M^\beta_{2,1} & M^\beta_{2,2} \end{bmatrix} \begin{bmatrix} M^\gamma_{1,1} & 0 & M^\gamma_{1,2} & 0 \\ 0 & M^\gamma_{1,1} & 0 & M^\gamma_{1,2} \\ M^\gamma_{2,1} & 0 & M^\gamma_{2,2} & 0 \\ 0 & M^\gamma_{2,1} & 0 & M^\gamma_{2,2} \end{bmatrix} \middle| \begin{array}{l} \alpha \in \{1,2,3,4\}, \\ \beta \in \{1,2,3,4\}, \gamma \in \{1,2,3,4\} \end{array} \right\}$$

wherein the sub-block $$\begin{bmatrix} M^i_{1,1} & M^i_{1,2} \\ M^i_{2,1} & M^i_{2,2} \end{bmatrix},$$

for i∈ {α, β, γ}, is given by one of the four matrices in Table 1. One example of such set of 16 matrices $V_{cm}$ is given in Table 2.

A codebook $CB_{cm}$ can be obtained from the set of matrices where the chordal distance is used. One example of such precoders with size 64 are given in Table 4, Table 5, Table 6, and Table 7 for rank 1, 2, 3 and 4, where a subset of the first s precoders in each codebook can be used to obtain another codebook with size s≤64.

In some embodiments, a finite set of the second component matrices has a form of $$V_{ncm} \in \left\{ \begin{bmatrix} \cos\varphi_x & \sin\varphi_x & 0 & 0 \\ \sin\varphi_x & \cos\varphi_x & 0 & 0 \\ 0 & 0 & \cos\varphi_y & \sin\varphi_y \\ 0 & 0 & \sin\varphi_y & \cos\varphi_y \end{bmatrix} \begin{bmatrix} \cos\varphi_z & 0 & \sin\varphi_z & 0 \\ 0 & \cos\varphi_z & 0 & \sin\varphi_z \\ \sin\varphi_z & 0 & \cos\varphi_z & 0 \\ 0 & \sin\varphi_z & 0 & \cos\varphi_z \end{bmatrix} \middle| \begin{array}{l} \varphi_x, \\ \varphi_y, \varphi_z \in \Phi_M \end{array} \right\}$$

wherein $\Phi_m$ is the set of M angles given by $$\Phi_M = \left\{ \frac{m\pi}{2(M+1)} \;\middle|\; m = 1, 2, \ldots, M \right\}.$$

In some embodiments, four matrix sets $U_{ncm}^{\ r}$ are defined with rank r, r=1,2,3,4, by properly selecting r columns of each NCM matrix $V_{ncm}^{\ n}$. One example of the four sets $U_{ncm}^{\ 1}$, $U_{ncm}^{\ 2}$, $U_{ncm}^{\ 3}$, and $U_{ncm}^{\ 4}$ are given in Table 8, Table 9, Table 10, and Table 11 for rank 1, 2, 3, and 4.

In some embodiments, the non-constant-modulus $CB_{ncm}$ is obtained by using constant-modulus codebooks $CB_{cm}$ and matrix sets $U_{ncm}^{\ r}$. One example of rank-r codebook is given by an element-wise production between the two matrices $$CB_{ncm}^{\ r} = \{c_{ncm}^{\ r,k} \odot u_{ncm}^{\ r,i} | c_{ncm}^{\ r,k} \in CB_{cm}^{\ r,k}, u_{ncm}^{\ r,i} \in U_{ncm}^{\ r}\} \qquad \text{i)}$$

Some embodiments may include the following:
1. (The transmission power is for each port and layer, and is from a codebook. The power is applied on top of a constant modulus codebook, e.g., $V_{cm}$ or the 3GPP Rel-15 codebook) A method of adjusting the transmission power of antenna ports in a multi-antenna transmission, comprising:
   a. Receiving an indication of a number of layers to be used to transmit a physical channel,
   b. Receiving an indication of a set of transmission powers, wherein
      i. each transmission power in the set corresponds to an antenna port and to a layer of the number of layers to be used to transmit the physical channel,
      ii. the indicated set of transmission powers is one of a list of predetermined sets
   c. Receiving an indication of a set of phase shifts to apply to the antenna ports, wherein
      i. each phase shift in the set of phase shifts corresponds to an antenna port and to a layer of the number of layers to be used to transmit the physical channel,
      ii. the indicated set of phase shifts is one of a list of predetermined sets
   d. Transmitting each layer of the physical channel on each of the antenna ports with the indicated phase shift and the indicated power for the antenna port and layer
2. (The WD operates in both a constant modulus and a non-constant modulus mode of operation) A method of transmitting in a constant modulus or a non-constant modulus mode of uplink multi-antenna transmission, comprising:
   a. Receiving an indication of a number of layers to be used to transmit a physical channel,
   b. Receiving an indication of a set of phase shifts to apply to the antenna ports, wherein
      i. each phase shift in the set of phase shifts corresponds to an antenna port and to a layer of the number of layers to be used to transmit the physical channel,
      ii. the indicated set of phase shifts is one of a list of predetermined sets
   c. In the non-constant modulus mode of operation, receiving an indication of a set of transmission powers, wherein
      i. each transmission power in the set corresponds to an antenna port and to a layer of the number of layers to be used to transmit the physical channel,
      ii. the indicated set of transmission powers is one of a list of predetermined sets
   d. In the non-constant modulus mode of operation, transmitting each layer of the physical channel on each of the antenna ports with the indicated phase shift and the indicated power for the antenna port and layer
   e. In the constant modulus mode of operation, transmitting each layer of the physical channel on each of the antenna ports with the indicated phase shift for the antenna port and layer
3. (The constant modulus precoder is from Rel-15) The method of 1 or 2, wherein
   a. The indication of the set of phase shifts is provided by an indication of a precoding matrix from 3 GPP NR Release 15.
4. (The power in a pair of layers is the same) The method of 1 or 2, wherein
   a. a sum of the transmission powers for the ports in a first layer is the same as a sum of the transmission powers for the ports in a second layer
5. (A port has a different power for different layers) The method of 1 or 2, wherein
   a. a transmission power corresponding to a first port and a first layer is different from a transmission power corresponding to the first port and a second layer.
6. (The port powers are drawn from a small alphabet of powers) The method of 1 or 2, wherein
   a. Each transmission power in the set is one of N candidate values, where N is less than or equal to the number of antenna ports used to transmit the physical channel.
7. (The set of powers for each layer is a permutation of the powers of another layer) The method of 1 or 2, wherein
   a. the transmission power used for each antenna port for a first layer is the same as the transmission power used for a different antenna port for a second layer
8. (The set of powers is given by the NCM component of the simplified decomposition)

The method of 1 or 2, wherein the set of transmission powers is given by:

According to one aspect, a network node 16 configured to communicate with a wireless device (WD) 22 is provided. The network node 16 includes a radio interface 62 and/or processing circuitry 68 configured to decompose a channel matrix by obtaining two component matrices, a first of the two component matrices being a constant modulus, CM, component matrix, $V_{cm}$, and the second of the two component matrices being a non-constant modulus, NCM, component matrix, $V_{ncm}$, a product of the two component matrices yielding the channel matrix. The processing circuitry and/or radio interface are further configured to determine a CM codebook based on the CM component matrix $V_{cm}$; and determine an NCM codebook based on the CM codebook and based on selected columns of the NCM component matrix $V_{ncm}$.

According to this aspect, in some embodiments, the processing circuitry 68 and/or radio interface 62 are further configured to apply the NCM codebook to determine a power to apply to each of a plurality of antennas of the network node 16 to form at least one beam. In some embodiments, the first component matrix is a matrix of known constants and the second component matrix has a property that all columns of the second component matric have a same norm. In some embodiments, the second component matrix has elements that are sinusoidal functions of angles.

According to another aspect, a method implemented in a network node 16 includes decomposing a channel matrix by obtaining two component matrices, a first of the two component matrices being a constant modulus, CM, component matrix, $V_{cm}$, and the second of the two component matrices being a non-constant modulus, NCM, component matrix, $V_{ncm}$, a product of the two component matrices yielding the channel matrix. The method includes determining a CM codebook based on the CM component matrix $V_{cm}$; and determining an NCM codebook based on the CM codebook and based on selected columns of the NCM component matrix $V_{ncm}$.

According to this aspect, in some embodiments, the method further include applying the NCM codebook to determine a power to apply to each of a plurality of antennas of the network node 16 to form at least one beam. In some embodiments, the first component matrix is a matrix of known constants and the second component matrix has a property that all columns of the second component matric have a same norm. In some embodiments, the second component matrix has elements that are sinusoidal functions of angles.

According to yet another aspect, a WD 22 is configured to communicate with a network node 16. The WD 22 includes a radio interface 82 and/or processing circuitry 84 configured to select between a constant modulus, CM, operating mode and a non-constant modulus, NCM, operating mode. The processing circuitry 84 and/or radio interface 82 are further configured to: in the CM operating mode, transmit on a physical channel using a CM precoder matrix; and in the NCM operating mode, transmit on a physical channel using a precoder matrix that is a product of the CM precoder matrix and an NCM precoder matrix. According to this aspect, the CM precoder matrix is selected from a set of predetermined precoder matrices.

According to another aspect, a method implemented in a wireless device (WD) includes selecting between a constant modulus, CM, operating mode and a non-constant modulus (NCM) operating mode. The method also includes, in the CM operating mode, transmitting on a physical channel using a CM precoder matrix. The method further includes, in the NCM operating mode, transmitting on a physical channel using a precoder matrix that is a product of the CM precoder matrix and an NCM precoder matrix. According to this aspect, in some embodiments, the CM precoder matrix is selected from a set of predetermined precoder matrices.

In some embodiments, the NCM codebooks are given by a component-wise product of a CM component codebook and NCM component codebook. The CM component codebook is derived based on a quantity of 4×4 CM basis matrices (e.g., 16 CM basis matrices from Table 2) and the NCM component codebook is derived based on a certain number of 4×4 NCM basis matrices (e.g., 8 NCM basis matrices from Table 3) for the 4 port example. The CM component codebook for rank-1 may be composed by selecting columns (e.g., size 4×1) from the CM basis matrices, up to a specific size, e.g., the codebook size 64, where this selection of columns steps leads to a permutation in the resulting codebook, as described herein. The CM component codebook for rank-2 may be composed by selecting a pair of columns (e.g., size 4×2 in a pair) from the CM basis matrices, up to a specific size, e.g., the codebook size 64. The CM component codebook for rank-3 and rank-4 may be composed in a similar manner to rank-1 and rank-2 examples. CM component codebooks may be stand-alone in that a codebook size from 1 to 64 may be supported.

The NCM component codebook for any one of rank 1, 2, 3 and 4 may be selected in a similar manner as described above with respect to the CM component codebook except that columns are selected from NCM basis matrices.

Examples

Example A1. A network node 16 configured to communicate with a wireless device 22 (WD 22), the network node 16 configured to, and/or comprising a radio interface 62 and/or comprising processing circuitry 68 configured to:
decompose a channel matrix by obtaining two component matrices, a first of the two component matrices being a constant modulus, CM, component matrix, $V_{cm}$, and the second of the two component matrices being a non-constant modulus, NCM, component matrix, $V_{ncm}$, a product of the two component matrices yielding the channel matrix; and
determine a CM codebook based on the CM component matrix $V_{cm}$; and
determine an NCM codebook based on the CM codebook and based on selected columns of the NCM component matrix $V_{ncm}$.

Example A2. The network node 16 of Example A1, wherein the processing circuitry 68 and/or radio interface 62 are further configured to apply the NCM codebook to a signal to be applied to each of a plurality of antennas of the network node 16 to form at least one beam.

Example A3. The network node 16 of Example A1, wherein the first component matrix is a matrix of known constants and the second component matrix has a property that all columns of the second component matric have a same norm.

Example A4. The network node 16 of any of Examples A1-A3, wherein the second component matrix has elements that are sinusoidal functions of angles.

Example B 1. A method implemented in a network node 16, the method comprising: decomposing a channel matrix by obtaining two component matrices, a first of the two component matrices being a constant modulus, CM, component matrix, $V_{cm}$, and the second of the two component matrices being a non-constant modulus, NCM, component matrix, $V_{ncm}$, a product of the two component matrices yielding the channel matrix; and
determining a CM codebook based on the CM component matrix $V_{cm}$; and
determining an NCM codebook based on the CM codebook and based on selected columns of the NCM component matrix $V_{ncm}$.

Example B2. The method of Example B1, further comprising applying the NCM codebook to a signal to be applied to each of a plurality of antennas of the network node to form at least one beam.

Example B3. The method of Example B1, wherein the first component matrix is a matrix of known constants and the second component matrix has a property that all columns of the second component matric have a same norm.

Example B4. The method of any of Examples B1-B3, wherein the second component matrix has elements that are sinusoidal functions of angles.

Example C1. A wireless device (WD) 22 configured to communicate with a network node 16, the WD 22 configured to, and/or comprising a radio interface 82 and/or processing circuitry 84 configured to:

select between a constant modulus, CM, operating mode and a non-constant modulus, NCM, operating mode;

in the CM operating mode, transmit on a physical channel using a CM precoder matrix; and in the NCM operating mode, transmit on a physical channel using a precoder matrix that is a product of the CM precoder matrix and an NCM precoder matrix.

Example C2. The WD 22 of Example C1, wherein the CM precoder matrix is selected from a set of predetermined precoder matrices.

Example D1. A method implemented in a wireless device 22 (WD 22), the method comprising:

selecting between a constant modulus, CM, operating mode and a non-constant modulus (NCM) operating mode;

in the CM operating mode, transmitting on a physical channel using a CM precoder matrix; and in the NCM operating mode, transmitting on a physical channel using a precoder matrix that is a product of the CM precoder matrix and an NCM precoder matrix.

Example D2. The method of Example D1, wherein the CM precoder matrix is selected from a set of predetermined precoder matrices.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A wireless device, comprising:

processing circuitry configured to:

cause transmission of one or more signals on a physical channel based on a non-constant modulus, NCM, precoder of a NCM codebook, the NCM codebook being based at least in part on a constant modulus, CM, codebook and a plurality of NCM component matrices, the plurality of NCM component matrices being based at least in part on a NCM component matrix mathematical expression, an approximate decomposition element-wise product of a CM component matrix mathematical expression and the NCM component matrix mathematical expression corresponding to a channel decomposition matrix.

2. The wireless device of claim 1, wherein the NCM codebook is based at least in part on an element-wise product of the CM codebook and selected columns of the plurality of NCM component matrices.

3. The wireless device of claim 1, wherein the CM codebook is based on a plurality of CM component matrices.

4. The wireless device of claim 3, wherein the CM codebook corresponds to selected columns of the plurality of CM component matrices.

5. The wireless device of claim 1, wherein the processing circuitry is further configured to one of:
receive the NCM codebook; and
be preconfigured with the NCM codebook.

6. The wireless device of claim 1, wherein the NCM codebook is a 4-port codebook having a rank of at least 1.

7. The wireless device of claim 1, wherein all non-zero elements in the CM component matrix mathematical expression have the same absolute value.

8. The wireless device of claim 1, wherein at least one non-zero element in the NCM component matrix mathematical expression does not have a same absolute value as at least one other non-zero element in the NCM component matrix mathematical expression.

9. A network node configured to communicate with a wireless device, the network node comprising:
processing circuitry configured to:
indicate to the wireless device a non-constant modulus, NCM, precoder of a NCM codebook to implement for transmitting on a physical channel, the NCM codebook being based at least in part on a constant modulus, CM, codebook and a plurality of NCM component matrices, the plurality of NCM component matrices being based at least in part on a NCM component matrix mathematical expression, an approximate decomposition element-wise product of a CM component matrix mathematical expression and the NCM component matrix mathematical expression corresponding to a channel decomposition matrix; and
receive a transmission on the physical channel from the wireless device that is based on the NCM precoder.

10. The network node of claim 9, wherein the NCM codebook is based at least in part on an element-wise product of the CM codebook and selected columns of the plurality of NCM component matrices.

11. The network node of claim 10, wherein the CM codebook is based on a plurality of CM component matrices.

12. The network node of claim 11, wherein the CM codebook corresponds to selected columns of the plurality of CM component matrices.

13. The network node of claim 9, wherein the NCM codebook is a 4-port codebook having a rank of at least 1.

14. The network node of claim 9, wherein all non-zero elements in the CM component matrix mathematical expression have the same absolute value.

15. The network node of claim 9, wherein at least one non-zero element in the NCM component matrix mathematical expression does not have a same absolute value as at least one other non-zero element in the NCM component matrix mathematical expression.

16. A method implemented by a wireless device, the method comprising:
transmitting one or more signals on a physical channel based on a non-constant modulus, NCM, precoder of a NCM codebook to transmit on a physical channel, the NCM codebook being based at least in part on a constant modulus, CM, codebook and a plurality of NCM component matrices, the plurality of NCM component matrices being based at least in part on a NCM component matrix mathematical expression, an approximate decomposition element-wise product of a CM component matrix mathematical expression and the NCM component matrix mathematical expression corresponding to a channel decomposition matrix.

17. The method of claim 16, wherein the NCM codebook is based at least in part on an element-wise product of the CM codebook and selected columns of the plurality of NCM component matrices.

18. The method of claim 16, wherein the CM codebook is based on a plurality of CM component matrices.

19. The method of claim 18, wherein the CM codebook corresponds to selected columns of the plurality of CM component matrices.

20. The method of claim 16, further comprising one of:
receiving the NCM codebook; and
being preconfigured with the NCM codebook.

21. The method of claim 16, wherein the NCM codebook is a 4-port codebook having a rank of at least 1.

22. The method of claim 16, wherein all non-zero elements in the CM component matrix mathematical expression have the same absolute value.

23. The method of claim 16, wherein at least one non-zero element in the NCM component matrix mathematical expression does not have a same absolute value as at least one other non-zero element in the NCM component matrix mathematical expression.

24. A method implemented by a network node that is configured to communicate with a wireless device, the method comprising:
indicating to the wireless device a non-constant modulus, NCM, precoder of a NCM codebook to implement for transmitting on a physical channel, the NCM codebook being based at least in part on a constant modulus, CM, codebook and a plurality of NCM component matrices, the plurality of NCM component matrices being based at least in part on a NCM component matrix mathematical expression, an approximate decomposition element-wise product of a CM component matrix mathematical expression and the NCM component matrix mathematical expression corresponding to a channel decomposition matrix; and
receiving a transmission on the physical channel from the wireless device that is based on the NCM precoder.

25. The method of claim 24, wherein the NCM codebook is based at least in part on an element-wise product of the CM codebook and selected columns of the plurality of NCM component matrices.

26. The method of claim 25, wherein the CM codebook is based on a plurality of CM component matrices.

* * * * *